(12) United States Patent
Barr et al.

(10) Patent No.: US 12,009,648 B1
(45) Date of Patent: *Jun. 11, 2024

(54) JUNCTION BOX FOR ELECTRICAL WIRING

(71) Applicant: RezGo, LLC, Burleson, TX (US)

(72) Inventors: David Barr, Burleson, TX (US); Jeff Davis, North Richland Hills, TX (US)

(73) Assignee: RezGo, LLC, Burleson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,983

(22) Filed: Nov. 28, 2022

Related U.S. Application Data

(63) Continuation-in-part of application No. 17/235,720, filed on Apr. 20, 2021, now Pat. No. 11,515,695.

(60) Provisional application No. 63/012,530, filed on Apr. 20, 2020.

(51) Int. Cl.
H02G 3/08 (2006.01)

(52) U.S. Cl.
CPC ............. *H02G 3/081* (2013.01); *H02G 3/086* (2013.01)

(58) Field of Classification Search
None
See application file for complete search history.

(56) References Cited

U.S. PATENT DOCUMENTS

| | | |
|---|---|---|
| 1,837,930 A | 12/1931 | Waite |
| 3,575,313 A | 4/1971 | Trachtenberg et al. |
| 3,610,561 A | 10/1971 | Greenwood |
| 3,780,209 A | 12/1973 | Schuplin |
| 3,962,574 A | 6/1976 | Zurla |
| 4,023,697 A | 5/1977 | Marrero |
| 4,039,135 A | 8/1977 | Schenk |
| 4,082,915 A | 4/1978 | Silver |
| 4,199,072 A | 4/1980 | Jacks |
| 4,223,178 A * | 9/1980 | Lass .......................... F16L 3/10 174/650 |
| 4,403,278 A | 9/1983 | Flood |
| 4,909,405 A | 3/1990 | Kerr, Jr. |
| 5,044,582 A | 9/1991 | Walters |
| 5,222,800 A | 6/1993 | Chan et al. |
| 5,505,420 A | 4/1996 | Brown |
| 5,900,583 A | 5/1999 | Russo |
| 5,938,157 A | 8/1999 | Reiker |
| 5,957,572 A | 9/1999 | Wedekind et al. |
| 6,162,096 A * | 12/2000 | Klaus .................. F21V 19/0095 439/76.1 |
| 6,207,897 B1 | 3/2001 | Reiker |

(Continued)

OTHER PUBLICATIONS

Office Action dated Mar. 17, 2022 for U.S. Pat. No. 11,515,695.

(Continued)

*Primary Examiner* — Krystal Robinson

(74) *Attorney, Agent, or Firm* — James E. Walton

(57) ABSTRACT

A junction box for electrical wiring includes a housing and a base plate. The housing is adapted to removably connect with the base plate to house the electrical connection. The base plate is secured to a support beam to provide stability to the junction box. The housing and the base plate are either of a unitary structure, or include tabs and/or attachment flanges that provide additional access and stability to the electrical connection, while reducing strain. The junction box may be secured to the support beam via a telescoping bar hanger.

16 Claims, 20 Drawing Sheets

(56) References Cited

U.S. PATENT DOCUMENTS

| | | |
|---|---|---|
| 6,207,898 B1 | 3/2001 | Reiker |
| 6,281,439 B1 | 8/2001 | Reiker |
| 6,335,486 B1 | 1/2002 | Reiker |
| 6,943,287 B2 | 9/2005 | Lloyd et al. |
| 7,771,094 B2 | 8/2010 | Goode |
| 9,010,696 B2 | 4/2015 | Siddiqui et al. |
| 9,040,848 B2 | 5/2015 | Phillips |
| 9,435,353 B1 | 9/2016 | Gretz |
| 9,887,524 B1 | 2/2018 | Gretz |
| 10,096,983 B2 | 10/2018 | Kummer |
| 11,025,041 B2 | 6/2021 | Thomas |
| 11,349,289 B2 | 5/2022 | Anderson |
| D964,235 S * | 9/2022 | Garcia .................. D12/181 |
| 2002/0112869 A1* | 8/2002 | Kobayashi ........... H05K 5/0073 |
| | | 174/50 |
| 2003/0183628 A1 | 10/2003 | Barr |
| 2007/0187402 A1 | 8/2007 | Dinh |
| 2009/0014209 A1 | 1/2009 | Forbis |
| 2009/0145624 A1 | 6/2009 | Chung |
| 2010/0089604 A1* | 4/2010 | Tang .................... H05K 5/0013 |
| | | 174/50 |
| 2011/0139483 A1* | 6/2011 | Richter ................. H02G 3/083 |
| | | 174/50 |

OTHER PUBLICATIONS

Response to Office Action dated Jun. 15, 2022 for U.S. Pat. No. 11,515,695.
Notice of Allowance dated Jul. 12, 2022 for U.S. Pat. No. 11,515,695.
Issue Notification dated Nov. 9, 2022 for U.S. Pat. No. 11,515,695.

* cited by examiner

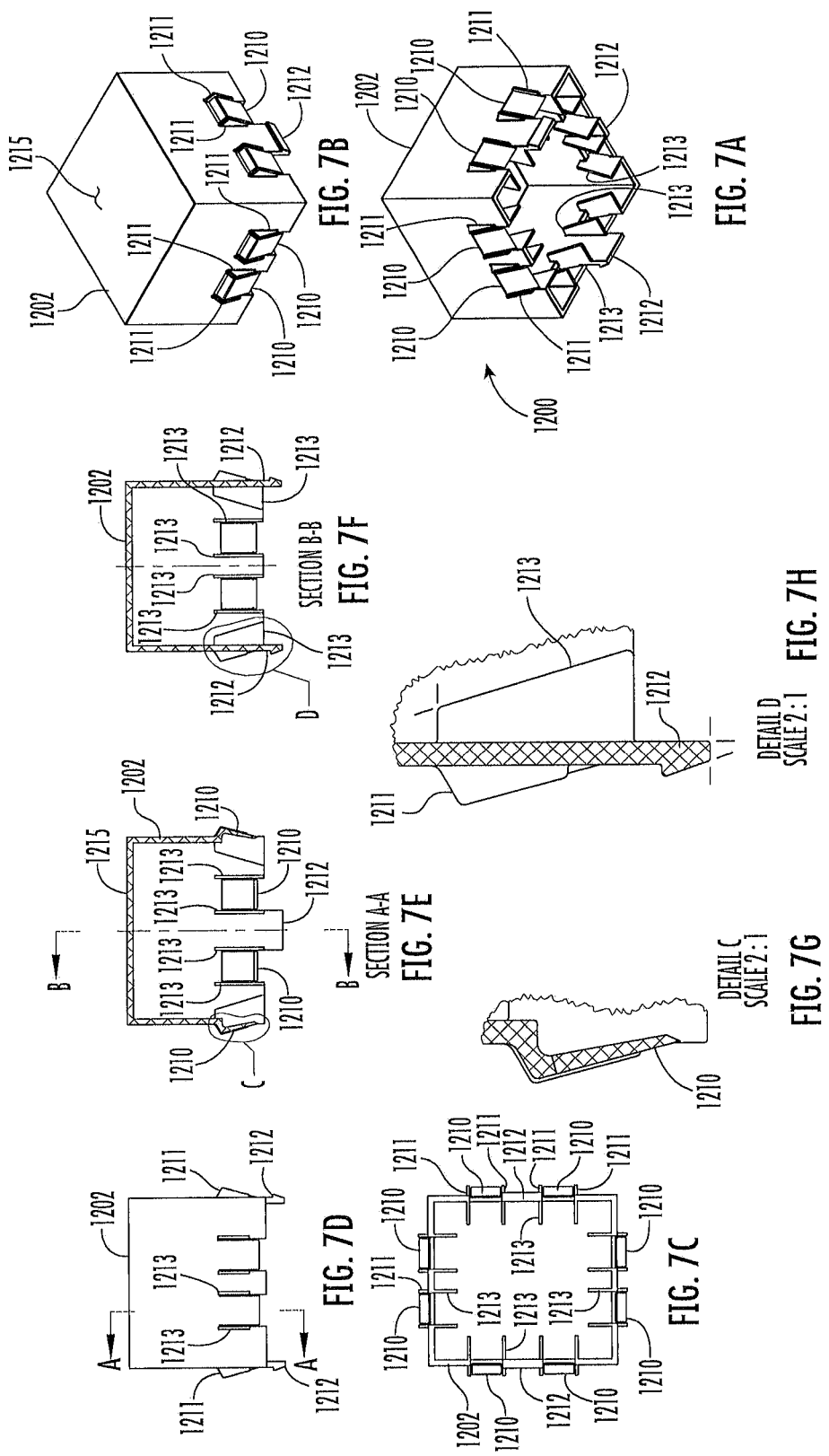

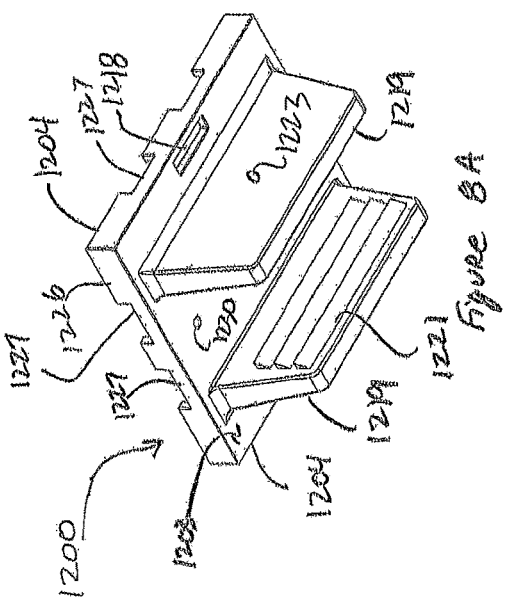
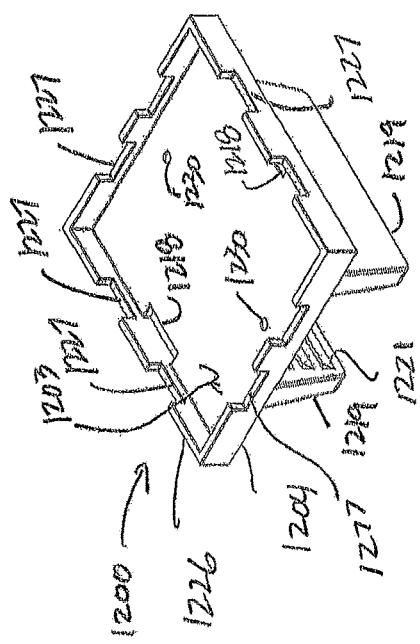
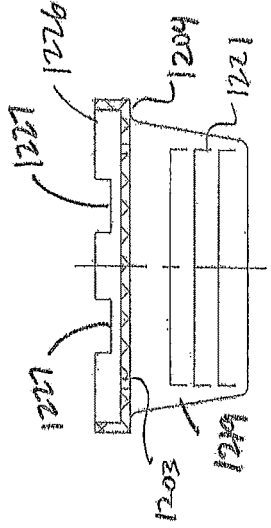
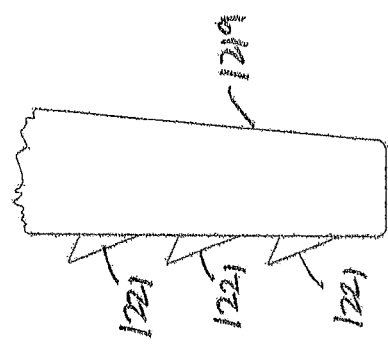
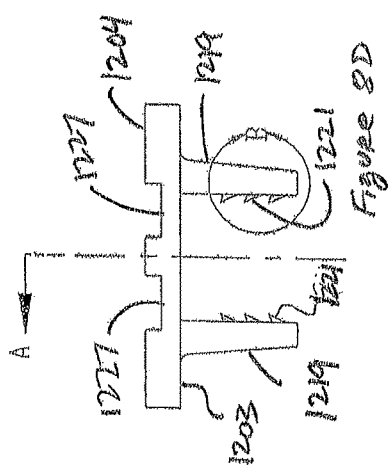
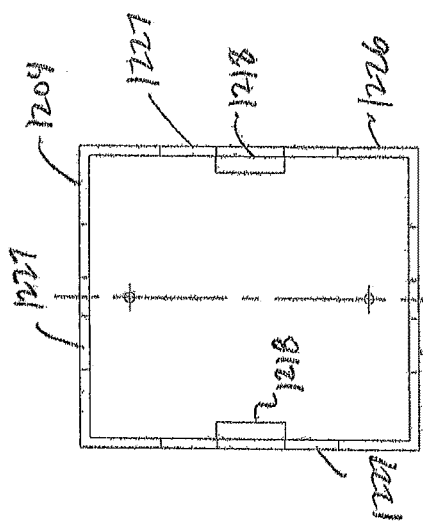

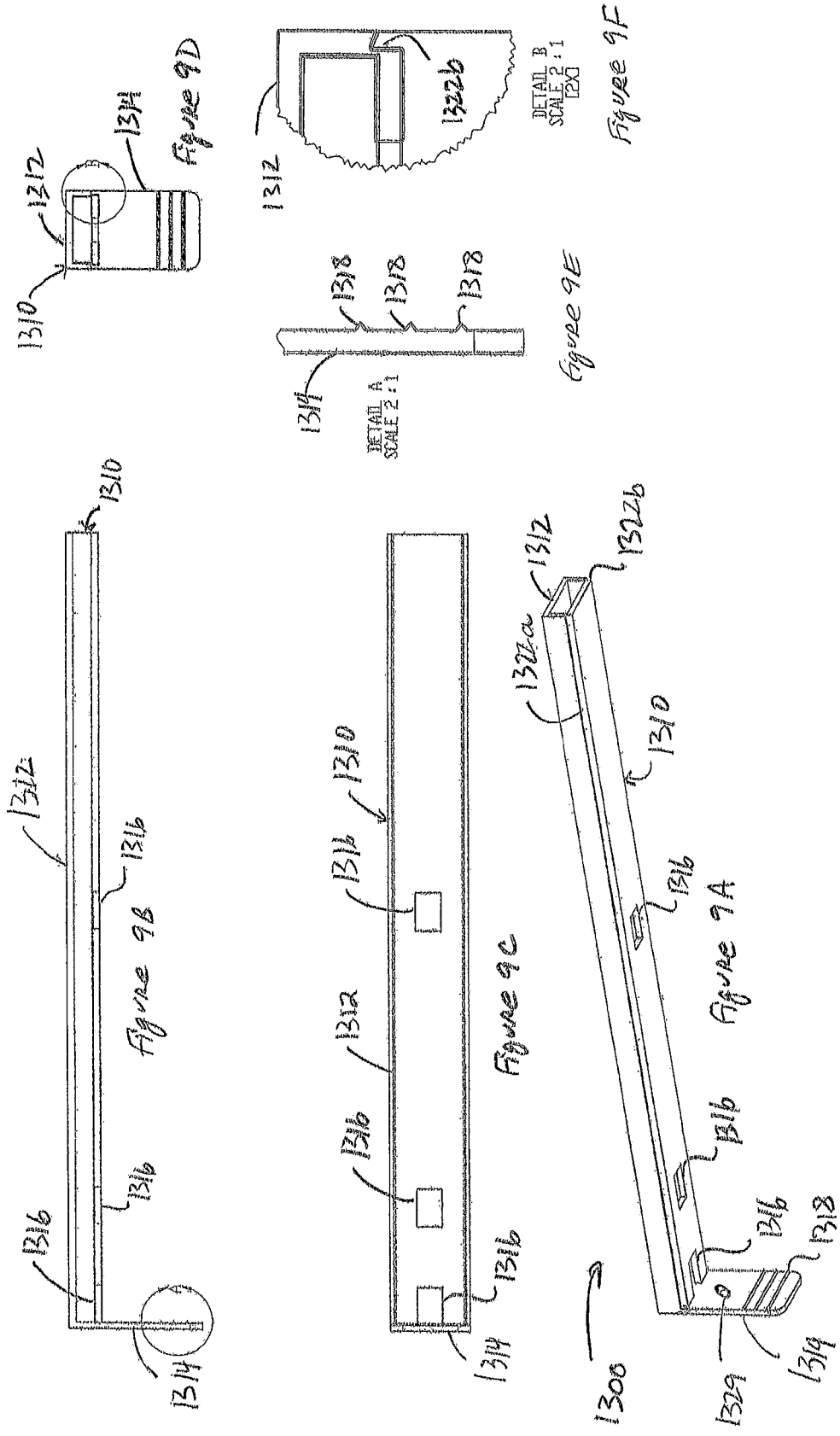

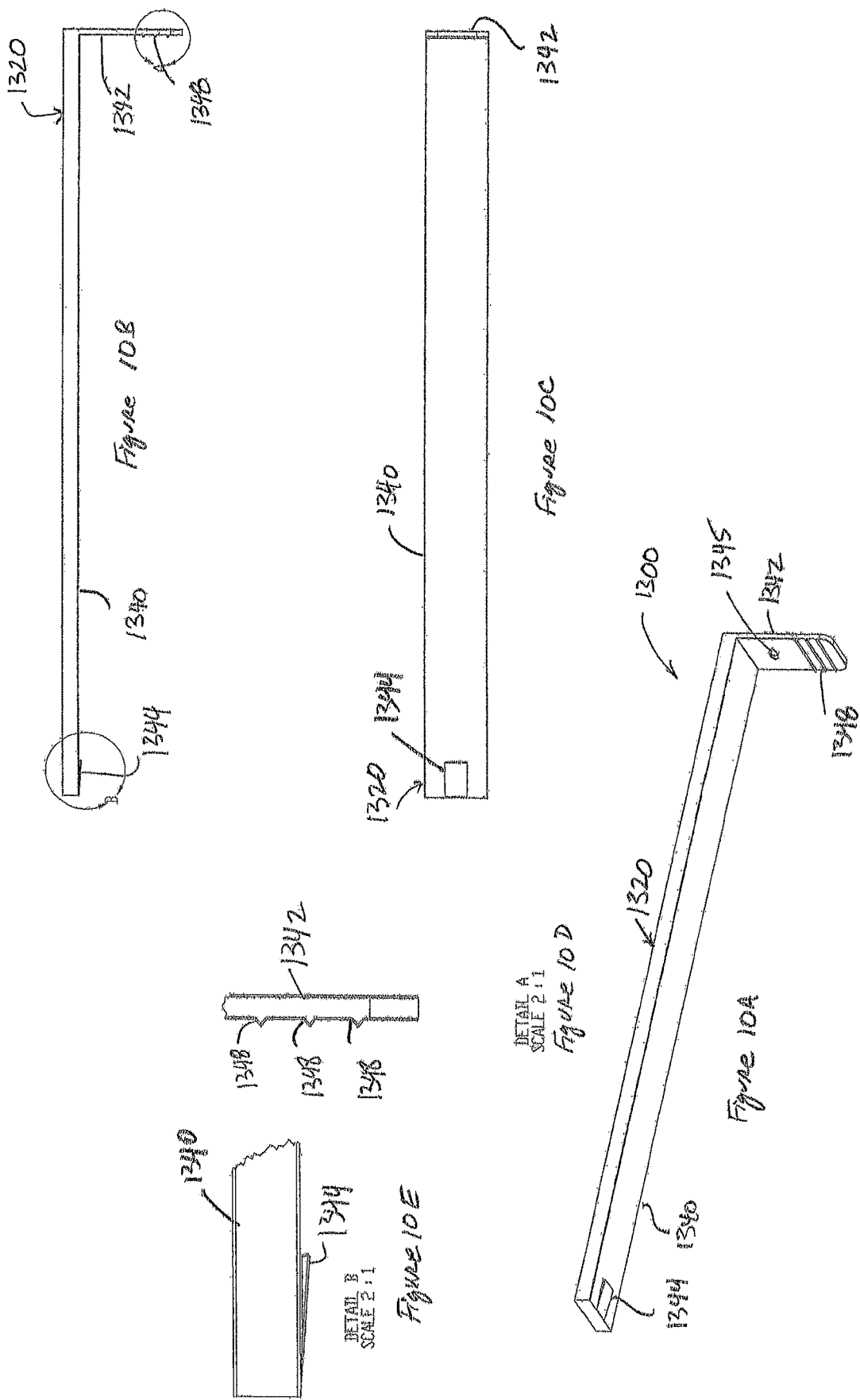

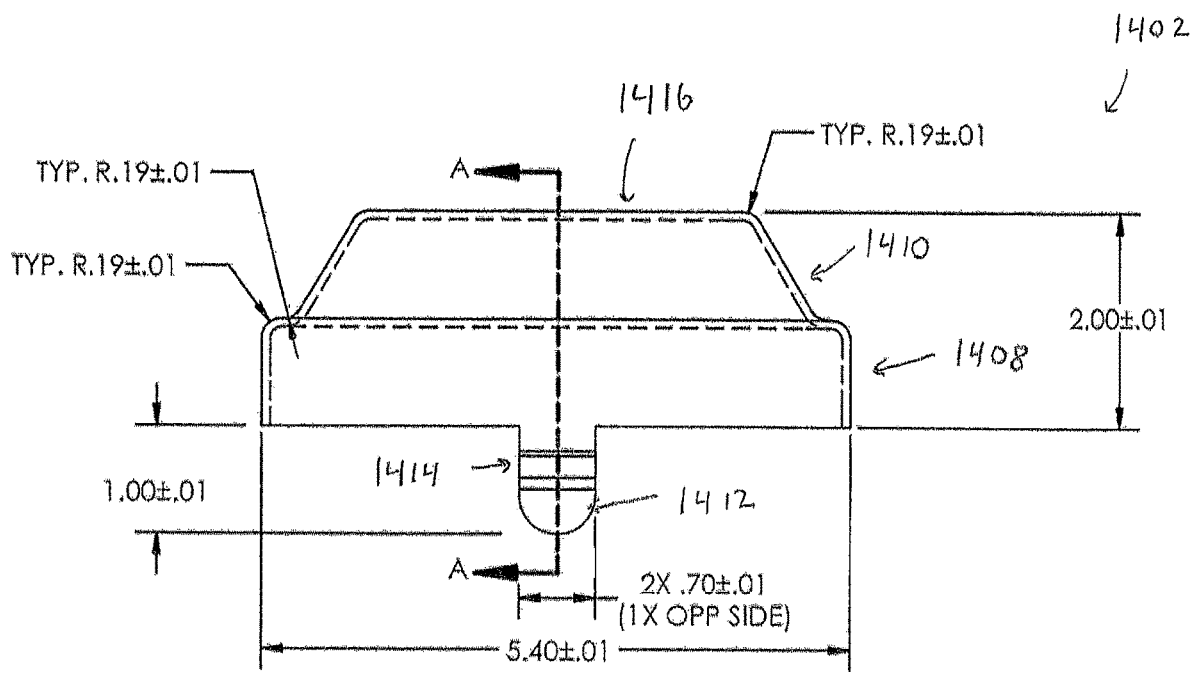
FIGURE 11c
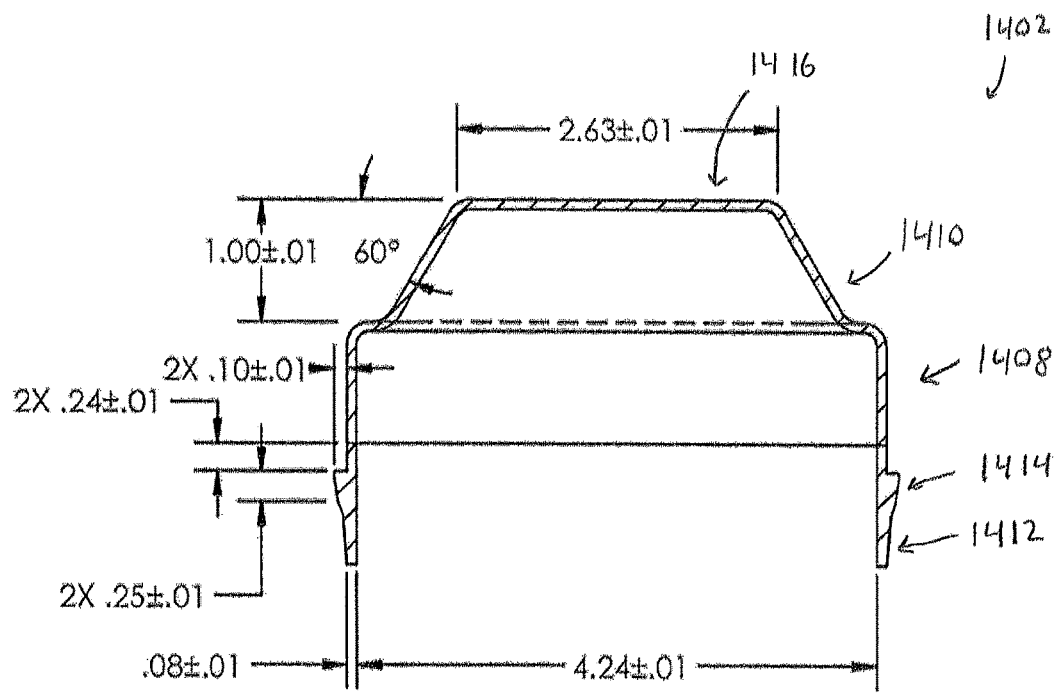
FIGURE 11D  SECTION A-A

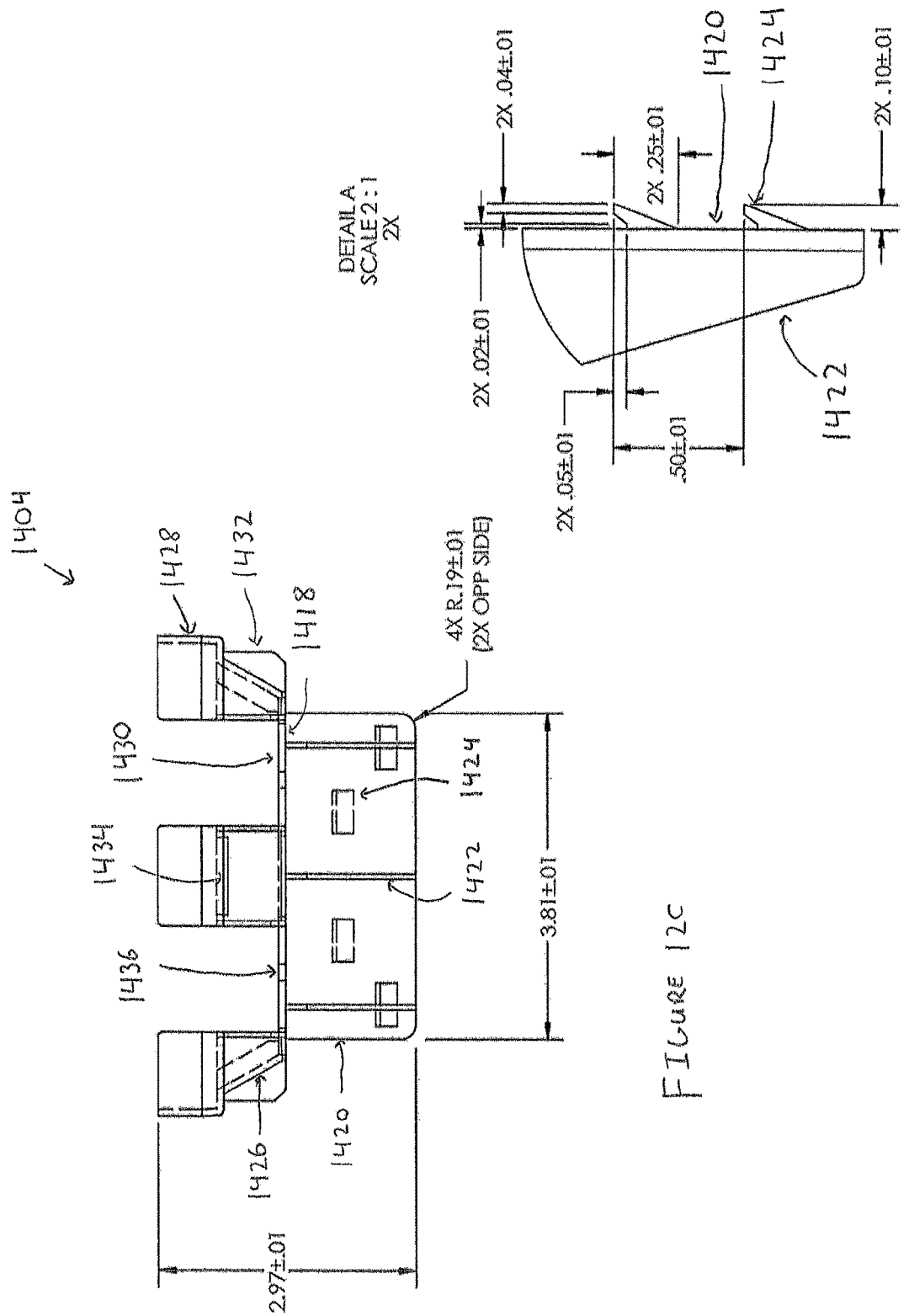

JUNCTION BOX FOR ELECTRICAL WIRING

This application is a Continuation-in-Part of U.S. patent application Ser. No. 17/235,720, filed 20 Apr. 2021, titled "Junction Box for Electrical Wiring," which claims the benefit of U.S. Provisional Application No. 63/012,530, filed 20 Apr. 2020, titled "Junction Box for Electrical Wiring," both of which are incorporated by reference herein for all purposes.

BACKGROUND

1. Field of the Invention

The present invention relates in general to the field of junction boxes for electrical wiring.

2. Description of Related Art

Electricians installing, repairing, or replacing residential and commercial wiring are required to install connections according to recognized industry standards, municipal codes, and local and federal regulations. For example, electrical splices must be housed within a junction box. A problem with fulfilling this requirement occurs when lengths of wire are stapled or otherwise secured, according to code, thereby preventing extension of the wire lengths to the junction box. If wire lengths are not exact, or if multiple repairs are made, there may be insufficient lengths to reach a junction box located at a fixed location.

Additional problems exist with current implementations of the junction box. For example, junction boxes usually include a main housing and a cover plate that is screwed to the top of the main housing. The main housing is either screwed or nailed to an underlying structure, such as a wall stud, ceiling joist, or rafter. Because the housing is secured, the electrical connections and connectors within the box must be accessed from the top. The access provided is limited due to the spatial constraints of the junction box and lack of slack in the wire connections.

These problems are compounded when inexperienced, unlicensed, or untrained workers perform unofficial home-improvement or business repairs themselves. Upon official inspection, many hazardous or improper connections are discovered, requiring attention and repair with minimal space, wire lengths, and time.

Thus, there exists significant room for improvement in the art for overcoming these and other shortcomings of existing junction boxes for electrical connections and wiring.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 7A-7H are various views of a housing of a junction box according to a preferred embodiment of the present application;

FIGS. 8A-8F are various views of a base plate corresponding to the housing of FIGS. 7A-7H;

FIGS. 9A-9F are various views of a female portion of a telescoping hanger bar corresponding to the junction box depicted in FIGS. 7A-7H and 8A-8F;

FIGS. 10A-10E are various views of a male portion corresponding to the female portion of FIGS. 9A-9F;

FIGS. 11A-11D are various views of a housing of a junction box according to a preferred embodiment of the present application;

FIGS. 12A-12E are various views of a base plate corresponding to the housing of FIGS. 11A-11D;

Figure 1:
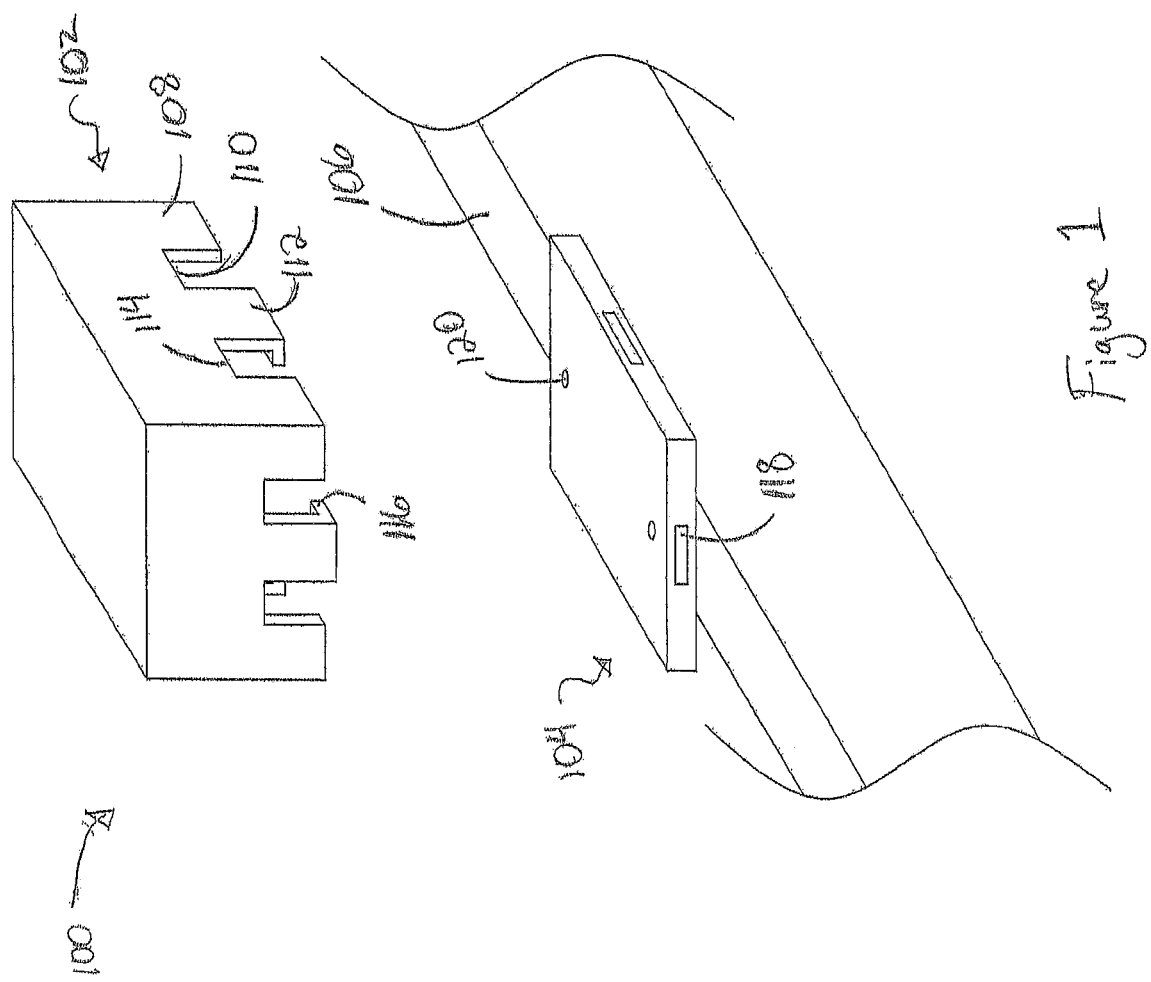
FIG. 1 is a perspective view of a junction box, base plate, and support according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the junction box with features including mobility, adjustability, adaptability, and unhindered access are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIGS. 1-6, perspective views of one embodiment of a junction box 100 according to the present application are illustrated. Junction box 100 comprises a housing 102 and a base plate 104, in which base plate 104 is configured to connect with housing 102 and attach to a support beam 106 using screws, nails, bolts, or other fasteners. Electrical connections and connectors are housed within housing 102, including wire nuts, spliced ends, electric-tape, stack or push-in wire connectors, alligator clips, and combinations thereof.

Housing 102 is preferably made of a flexible or semi-rigid material, such as plastic, and includes one or more crenellated walls 108. The crenellated wall 108 includes a notch or crenel 110 and a flanged tab 112. Crenel 110 remains open, even when housing 102 is connected to base plate 104, enabling electrical wires to extend out of junction box 100. Flanged tab 112 may include one or more perforations or indentations collinear with a top edge 114 of crenel 110. The perforations or indentations allow flanged tab 112 to become a "push-out" tab, by applying, force to the tab until it brakes, thereby providing additional space for electrical wiring and/or connections.

Alternatively, the perforations and/or indentations allow flanged tab 112 to provide strain relief to electrical connections and connectors housed within the housing. For example, the perforations allow flanged tab 112 to be pushed in slightly to bias or pin a wire of the electrical connection to base plate 104 when housing 102 is attached to base plate 104. By pinning the wire to base plate 104, the portion of the wire protruding out of junction box 100 may receive one or more forces, pulling, shaking, or attempting to withdraw the electrical connection from the junction box. However, the pinning force exerted by flanged tab 112 holds the electrical connection and the remaining portion of the wire secure within junction box 100, thereby providing significant strain relief to the connection. In some embodiments, the flanged tab includes additional biasing support from flexible ribs, a spring, a gusset, or combinations thereof.

In at least one embodiment flanged tab 112 is configured as a live hinge. The live hinge structurally provides an access port to junction box 100, without having to remove or break-off flanged tab 112. For example, flanged tab 112 may be formed from polyolefin sheet material, with a flexible hinge similar to a unitary polyolefin rolled or pinched hinge to provide ingress and egress to junction box 100 without requiring removal of flanged tab 112.

In a preferred embodiment, flange 116 of flanged tab 112 fits within a recess 118 formed in base plate 104. Base plate 104 is generally flat, having a width greater than a width of support beam 106, and includes openings 120 for receiving fasteners to secure base plate 104 to support beam 106. In other embodiments, base plate 104 is formed at an angle, such as a 90° angle, or is curved to mount to a curved portion of a support beam.

In some embodiments, an underside of housing 102 (not shown) includes clamps, tab fasteners, connection channeling, a connector tube, or combinations thereof, attached, secured, or formed in a unitary structure of housing 102. A first end of a first wire enters housing 102 through one side, and at least a second end of at least a second wire enters housing 102 through the same or a second side. The clamps, tab fasteners, connection channeling, connector tube, or combinations thereof, receive both ends (e.g., the first end of the first wire and the at least a second end of the at least a second wire) and electrically connect the two ends without requiring additional wire nuts, electrical tape, or similar connection means. In at least one embodiment, these housing connection means are more electrically insulated than the remaining portions of housing 102, are made of a nonconductive material, such as rubber, plastic, wood, fiber glass, or combinations thereof, and may include a metal or conductive portion to help facilitate the flow of current through the electrical connection without requiring wire nuts or similar connectors separate from, or in addition to, junction box 100. In another embodiment, these connection means are attached, secured, or formed in/on the unitary structure of base plate 104.

Alternatively, a channel with wire grippers, such as tabs, ribs, rubber coating, or combinations thereof, is formed in base plate 104. The channel houses, grips, and/or increases the friction exerted on the wires of the electrical connection of junction box 100, thereby providing another means of strain relief on the wires and electrical connection within junction box 100.

In at least one embodiment, a channel of the base plate 104, flanged tab 112 of housing 102, or other portions of junction box 112 includes a low-power, battery operated sensor or electrical current flow detector. A sensor with a magnetically permeable core that induces current in the windings of the core may be used, such as the CS11-L AC current sensor by Campbell Scientific®. Junction box 100 can thereby be monitored, such that when flow is no longer sensed or detected, an indication, alert, or notification can be provided to an exterior portion of the box. For example, a red LED on the junction box may indicate no current flow, while a green LED indicates present and operable electrical current flow through the junction box. Alternatively, the sensor or electrical current flow detector is not battery operated, and includes a coupling that allows it to draw the little power it requires to operate from a wire or wires within the junction box. By way of another example, the sensor/detector may include a low-power transmitter for transmitting an optical or electromagnetic signal (e.g., Bluetooth, short-range radio, Infrared, etc.) to a receiver of a smart meter, smart phone, or similar residential electrical grid monitor.

Housing 102 and/or base plate 104 may be configured with an RFID tag, such that the location of housing 102 and/or base plate 104 relative to a residential property is readily detectable by a home owner or technician having a RFID receiver or compatible hardware and software installed in a mobile device, such as a tablet, smart phone, or personal digital assistant (PDA) device.

It is preferred that junction box 100 is adapted for small-scale uses. For example, wires of 14-gauge and 12-gauge capacity may be contained within housing 102. The small-scale form factor allows for increased mobility of the junction box. In other embodiments, junction box 100 is scaled up to reasonable dimensions for larger wire capacities, such as 10-, 8-, 6-, and 3-gauge wires.

Figure 2:
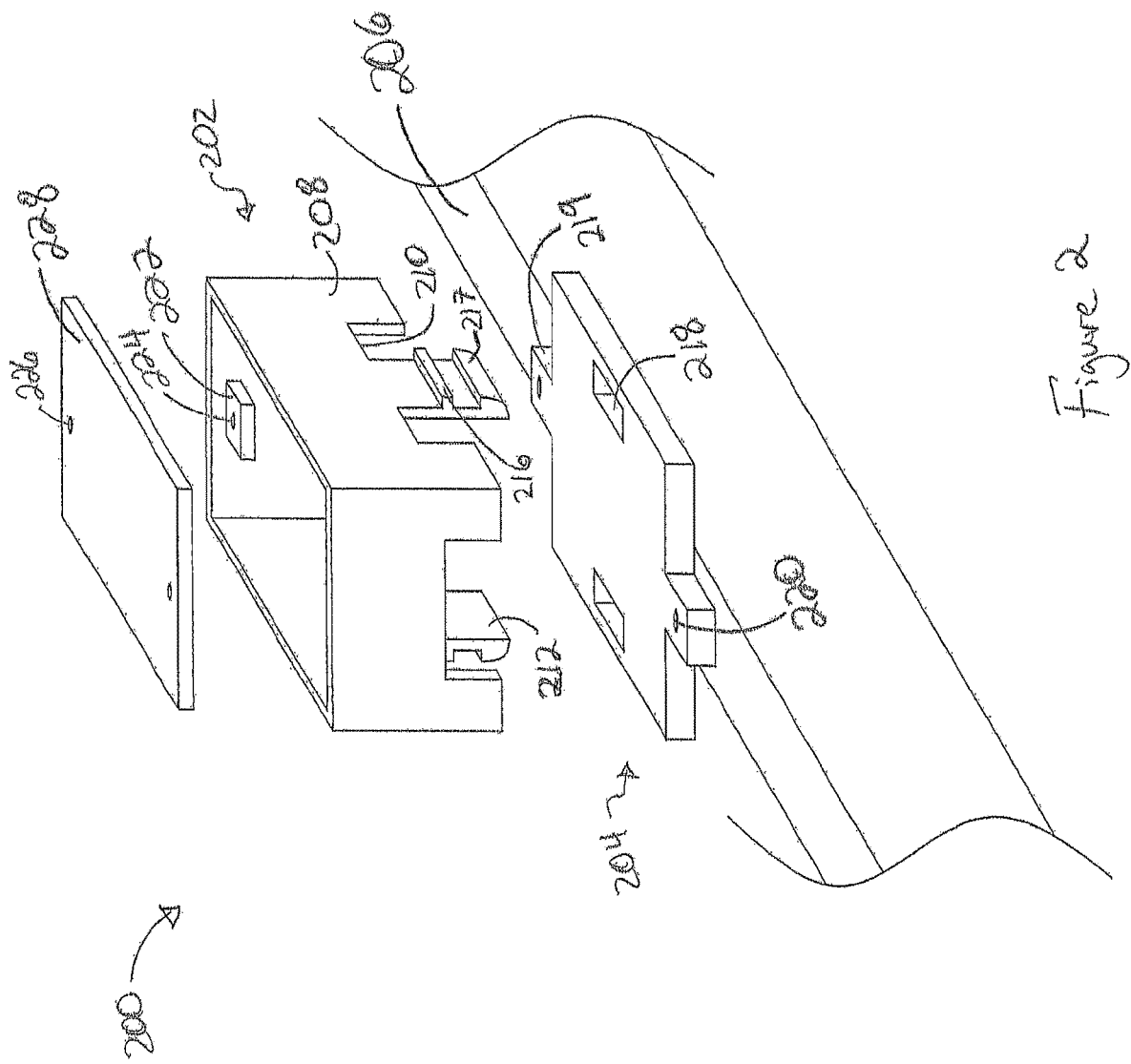
FIG. 2 is a perspective view of a junction box, base plate, cover plate, and support according to the present application.

Referring now also to FIG. 2 in the drawings, a junction box 200 according to an alternative embodiment of the present application comprises a housing 202 and a base plate 204, in which base plate 204 is configured to connect with the housing 202 and attach to a support beam 206. Junction box 200 includes similar features as junction box 100, except having additional features as discussed and described below.

Housing 202 is open topped. A crenellated wall 208 of housing 202 includes a crenel/notch 210 and a flanged tab 212 of different dimensions, such as a different lengths. Flanged tab 212 includes one or more additional flanges 217, where a shape or dimension of additional flange 217 may be the same or different than the shape and dimension of flange 216. For example, additional flange 217 may be curved and have a different length, such as ⅝ inch, than flange 216, which may be squared and have a length of ¼ inch.

Flange 216 of flanged tab 212 fits above a recess 218 formed in base plate 204, while flange 217 fits beneath recess 218. This fitting allows for ease of removal of housing 202 from base plate 204 by merely pressing flange 217 of tab 212 that is protruding beneath recess 218.

Base plate 204 includes one or more attachment tabs 219. Attachment tab 219 is formed together with the unitary shape of base plate 204, having attachment openings 220 for fasteners formed or cut therein.

Housing 202 includes one or more attachment tabs 222 formed or attached to the unitary shape of housing 202, having attachment openings 224 formed or cut therein. Attachment openings 226 formed in a cover plate 228 abut and collinearly align with attachment openings 224 in attachment tabs 222. Attachment tabs 219 and 222 are preferably squared, but may be rectilinear, curved, triangular, or of any operable geometric shape.

Figure 3:
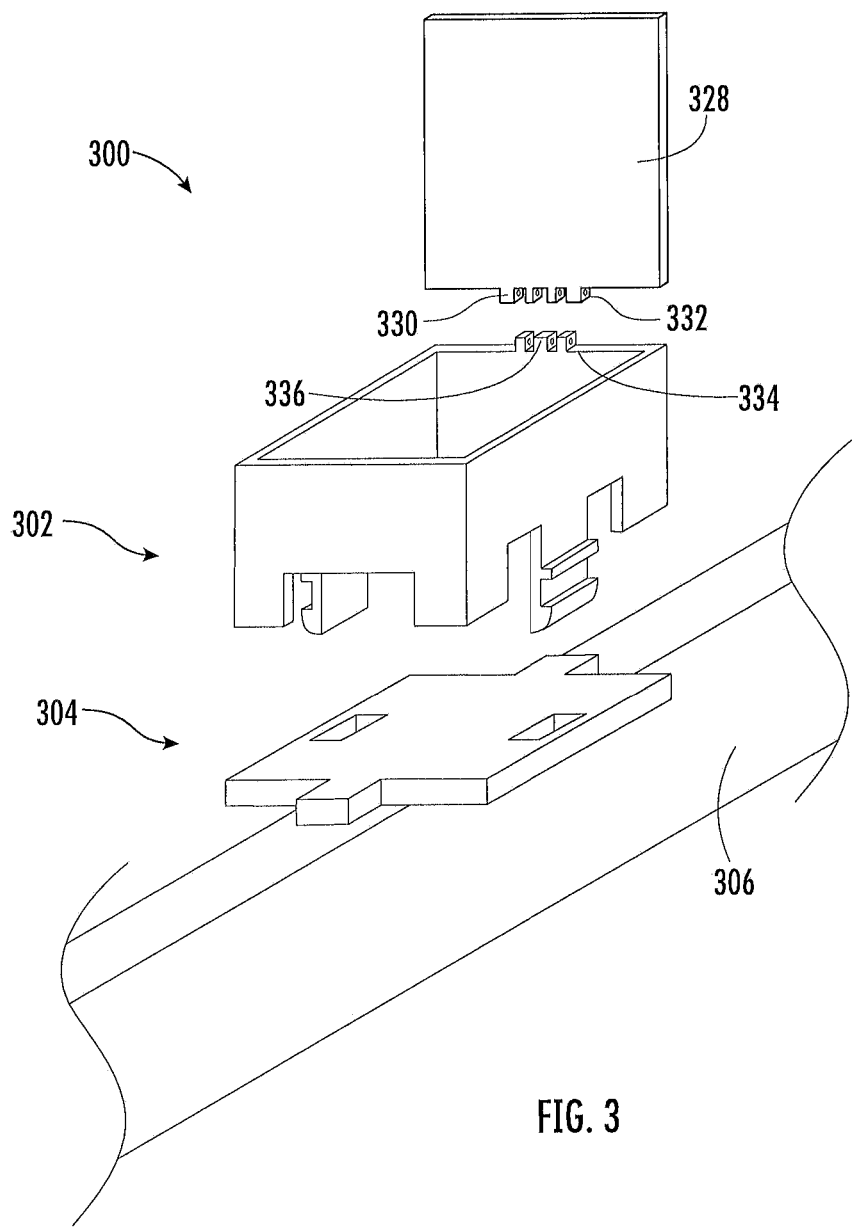
FIG. 3 is a perspective view of a junction box, base plate, hinged cover plate, and support according to the present application.

Referring now also to FIG. 3 in the drawings, a junction box 300 according to an alternative embodiment of the present application comprises a housing 302 and a base plate 304, in which base plate 304 is configured to connect with housing 302 and attach to a support beam 306. Junction box 300 includes similar features as junction box 100, except having additional features as discussed and described below.

A cover plate 328 of junction box 300 includes one or more hinge tabs 330 having hinge openings 332 formed or cut therein. The hinge opening 332 abuts and collinearly aligns with hinge opening 334 formed or cut in hinge tab 336 of housing 302. A pin, wire, screw, nail, or other fastener is inserted into hinge openings 332, 334 to enable the bubble top cover plate 328 to be moved between open and closed positions.

Figure 4:
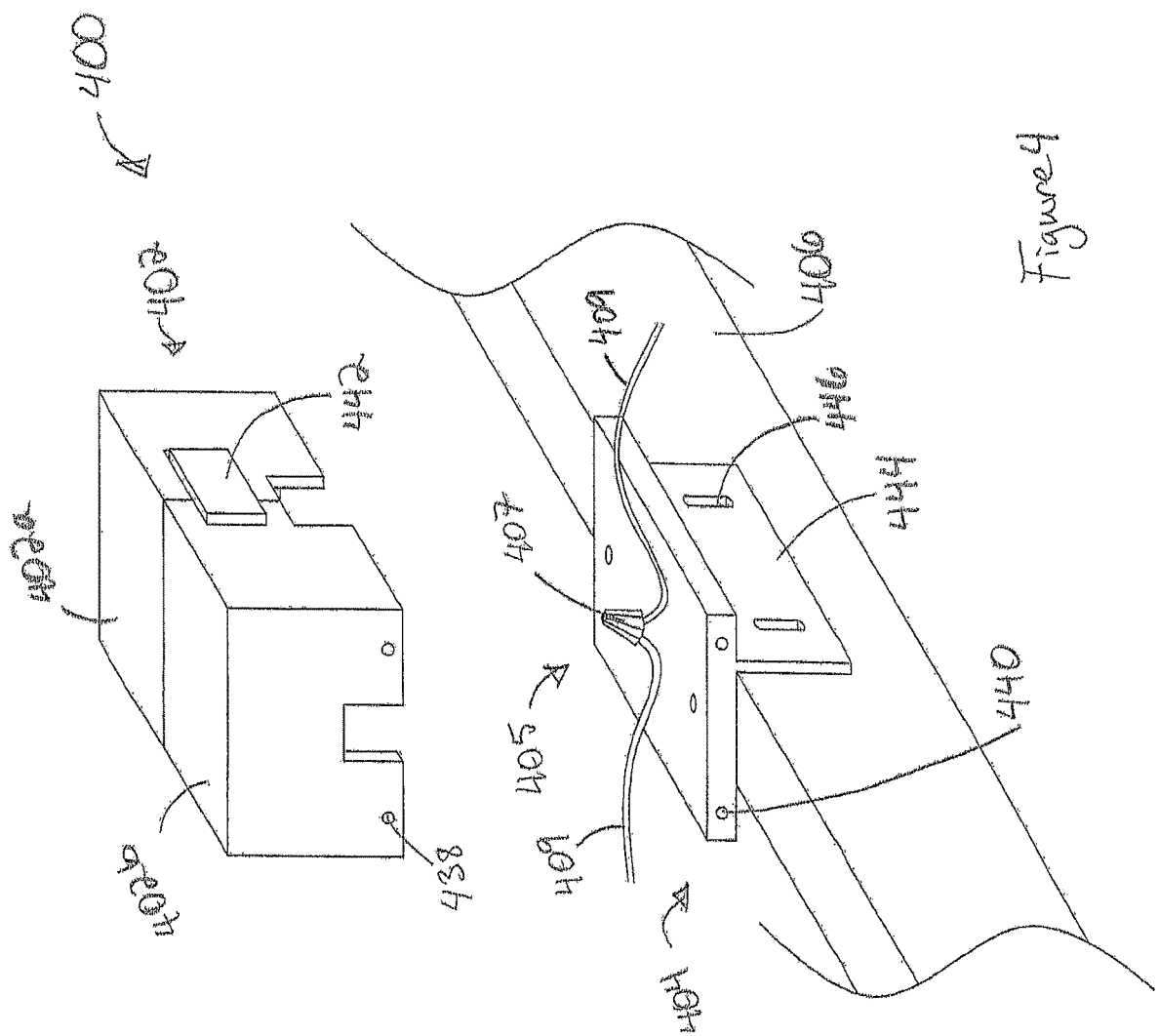
FIG. 4 is a perspective view of a split-piece junction box, base plate, electrical connection, and support according to the present application.

Referring now also to FIG. 4 in the drawings, a junction box 400 according to an alternative embodiment of the present application comprises a housing 402 and a base plate 404, in which base plate 404 is configured to connect with the housing 402 and attach to a support beam 406. An electrical connection 405, including a connector 407 connecting two wires 409, are housed within housing 402. Junction box 400 includes similar features as junction box 100, except having features removed or having features added as discussed and described below.

Junction box 400 is a split-top, or split-piece, junction box. For example, housing 402 includes a first halve 402a and a second half 402b. Housing 402 includes attachment openings 438 formed in a wall of the housing to abut and collinearly align with attachment openings 440 formed or cut in base plate 404. Housing 402 includes a flexible, flanged attachment tab 442 for connecting halves 402a and 402b of housing 402. Attachment tab 442 is preferably attached using adhesive, fasteners, or a combination thereof, but may also be formed into the unitary shape of half 402a or 402b of junction box 400.

Base plate 404 includes a gusset 444, having attachment openings 446 formed or cut therein. Attachment openings 446 are elongated to allow for adjusting an attachment dimension of base plate 404, such as an attachment height or length relative to support beam 406.

Figure 5:
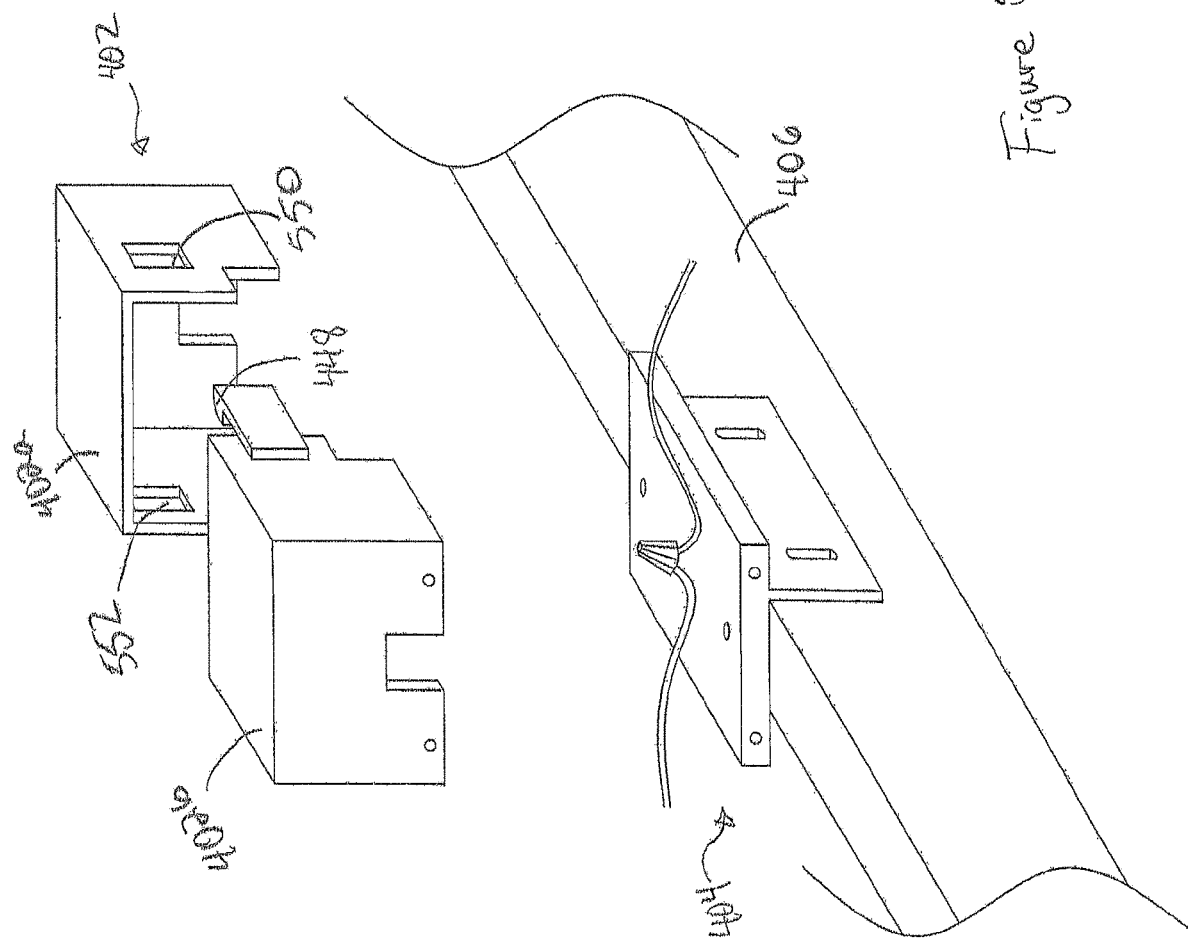
FIG. 5 is a perspective view of a split-piece junction box, base plate, electrical connection, and support according to the present application.

Referring now to FIG. 5 in the drawings, an opened housing 402 of FIG. 4 depicting both halves 402a and 402b apart from each other is illustrated. A flange 448 of attachment tab 442 of housing half 402b is formed to abut an edge 550 of a recess 552 formed in the opposing housing half 402a.

Figure 6:
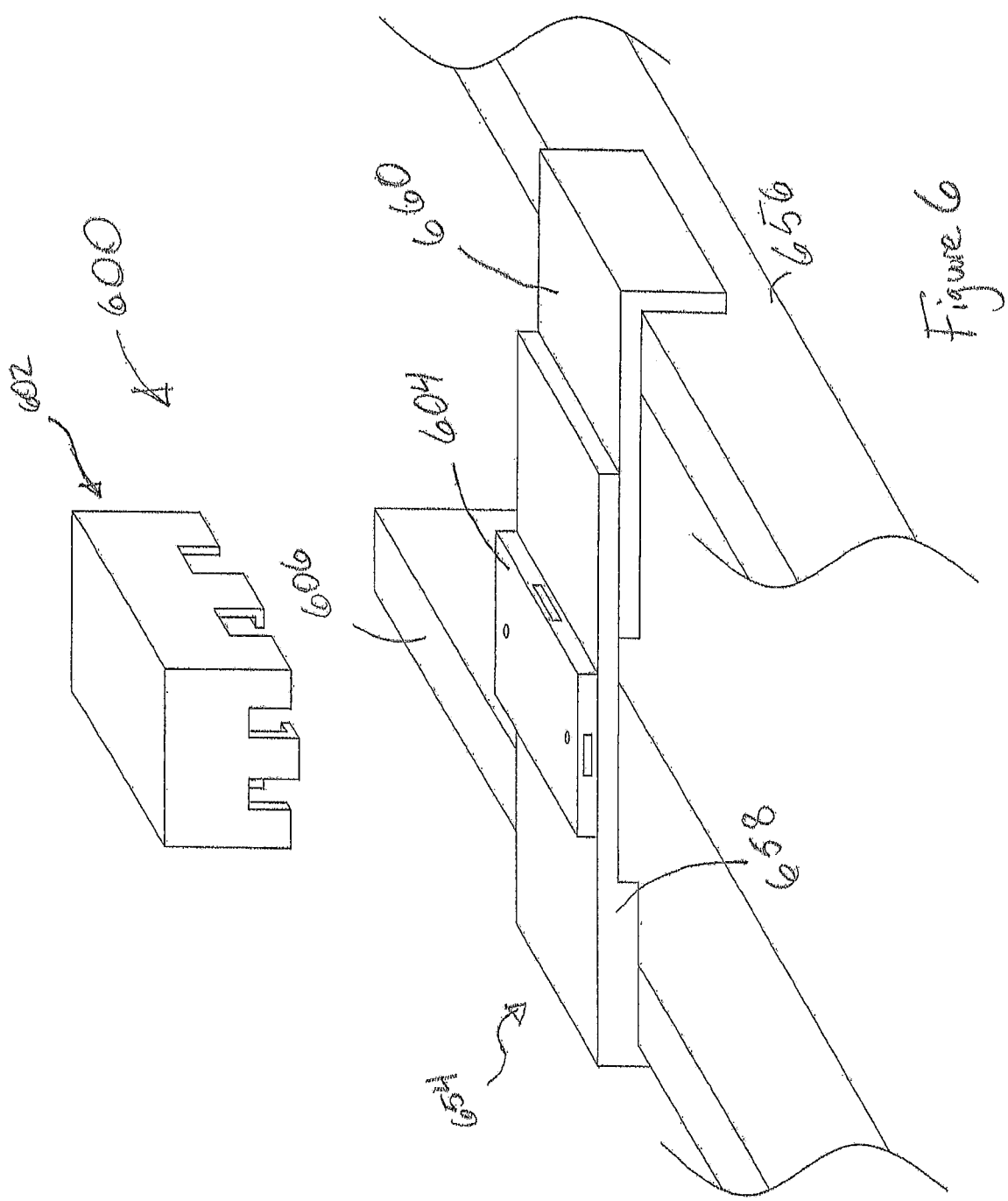
FIG. 6 is a perspective view of a junction box, base plate, and base plate telescopic extension according to the present application.
Figure 11A:
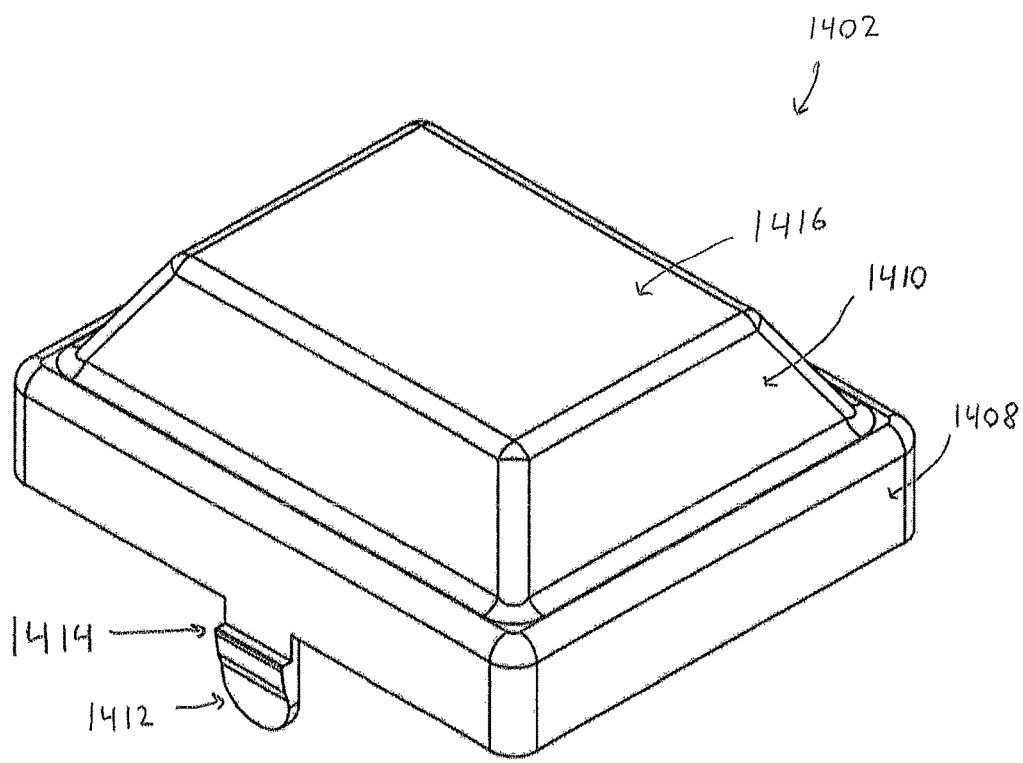
Figure 11B:
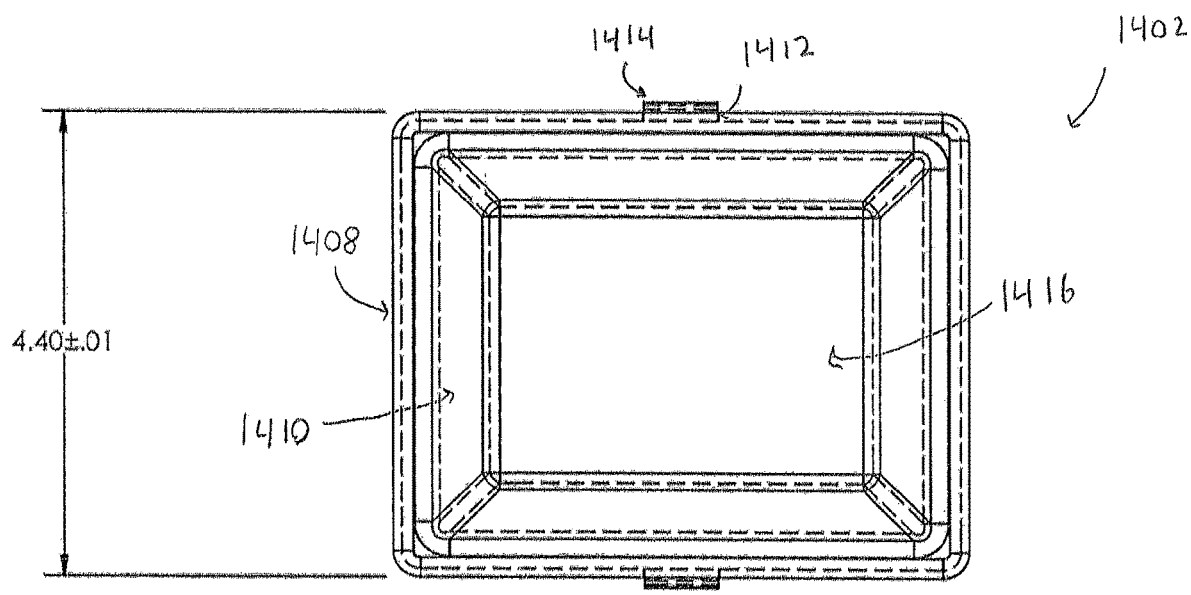
Figure 12A:
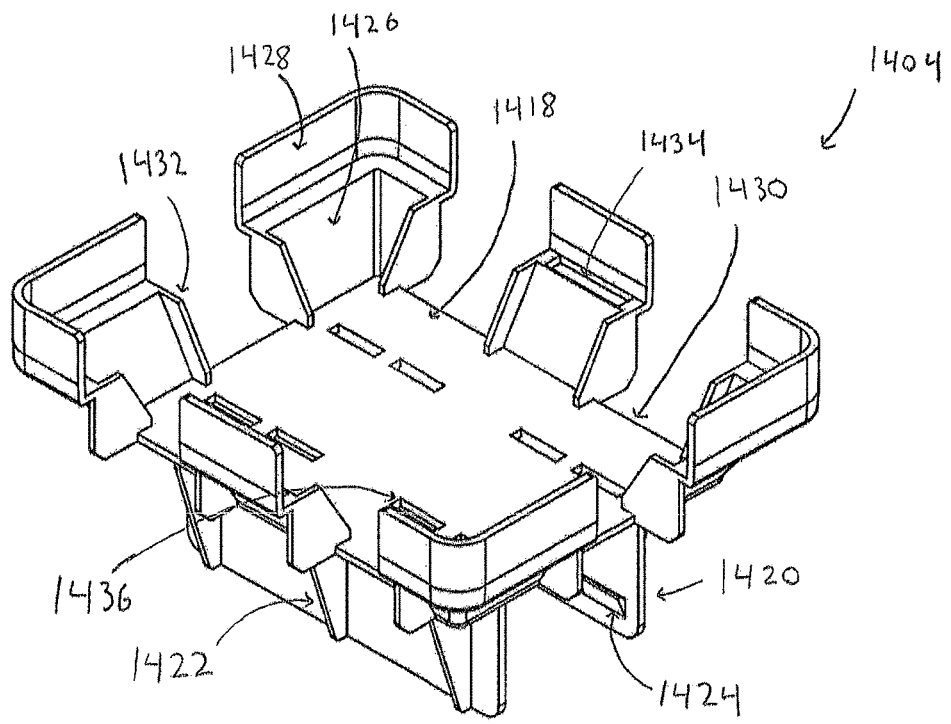
Figure 12B:
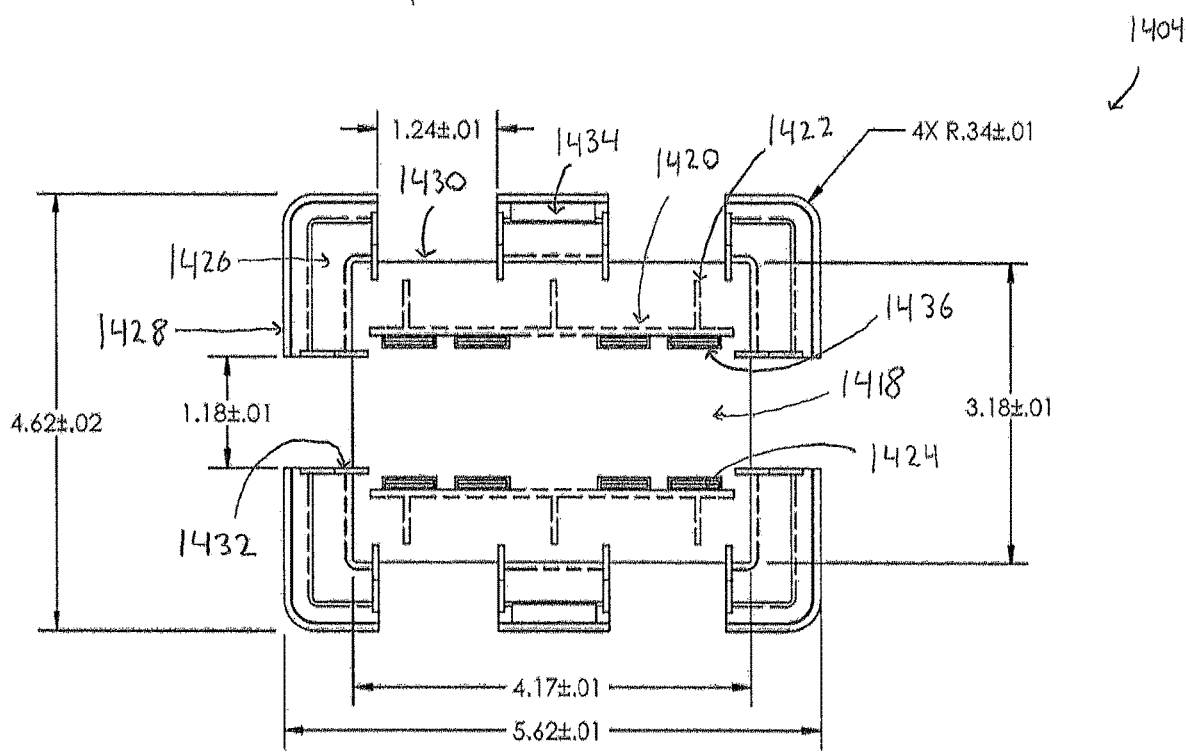
Figure 12D:
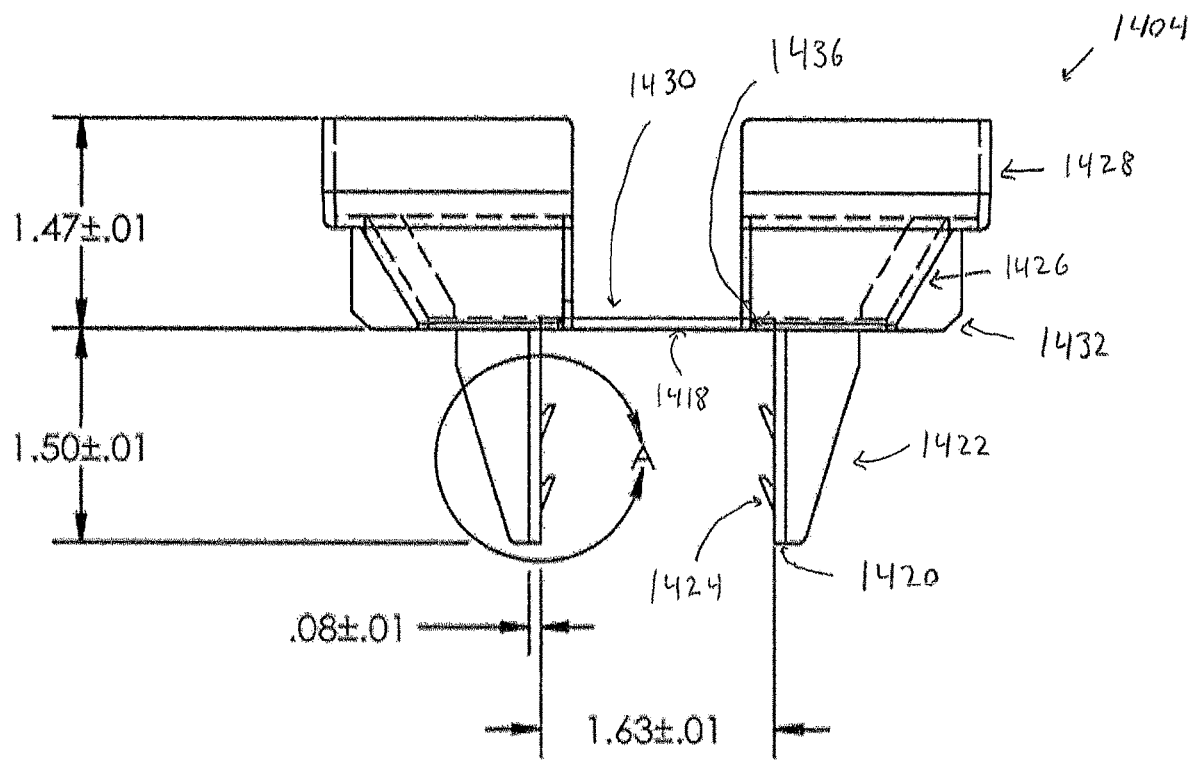
Figure 13A:
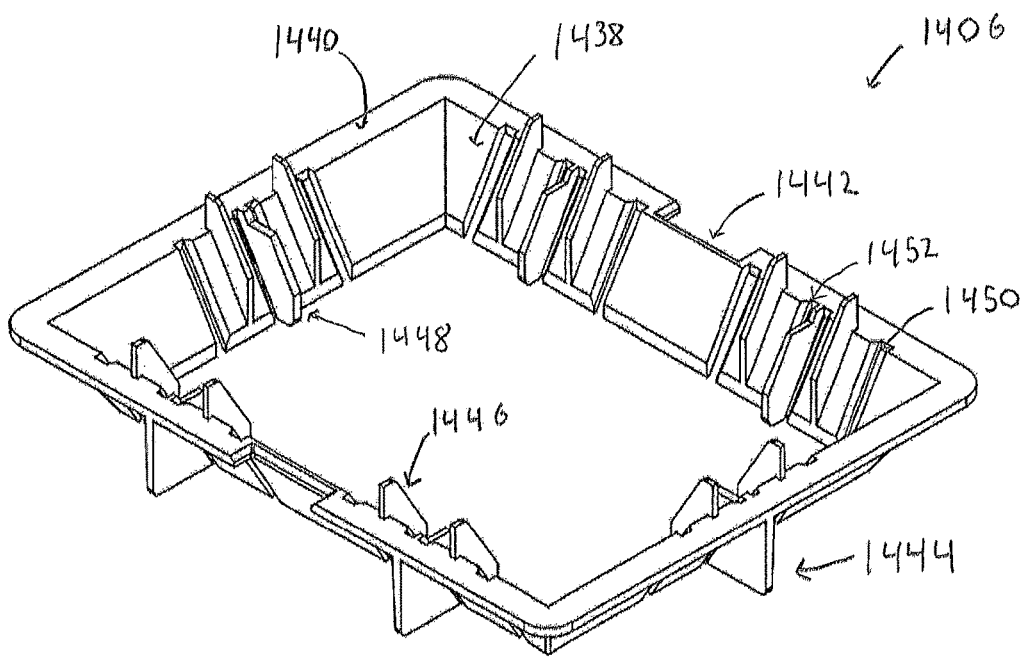
FIGS. 13A-13E are various views of a locking insert corresponding to the housing of FIGS. 11A-11D and the base plate of FIGS. 12A-12E.
Figure 13B:
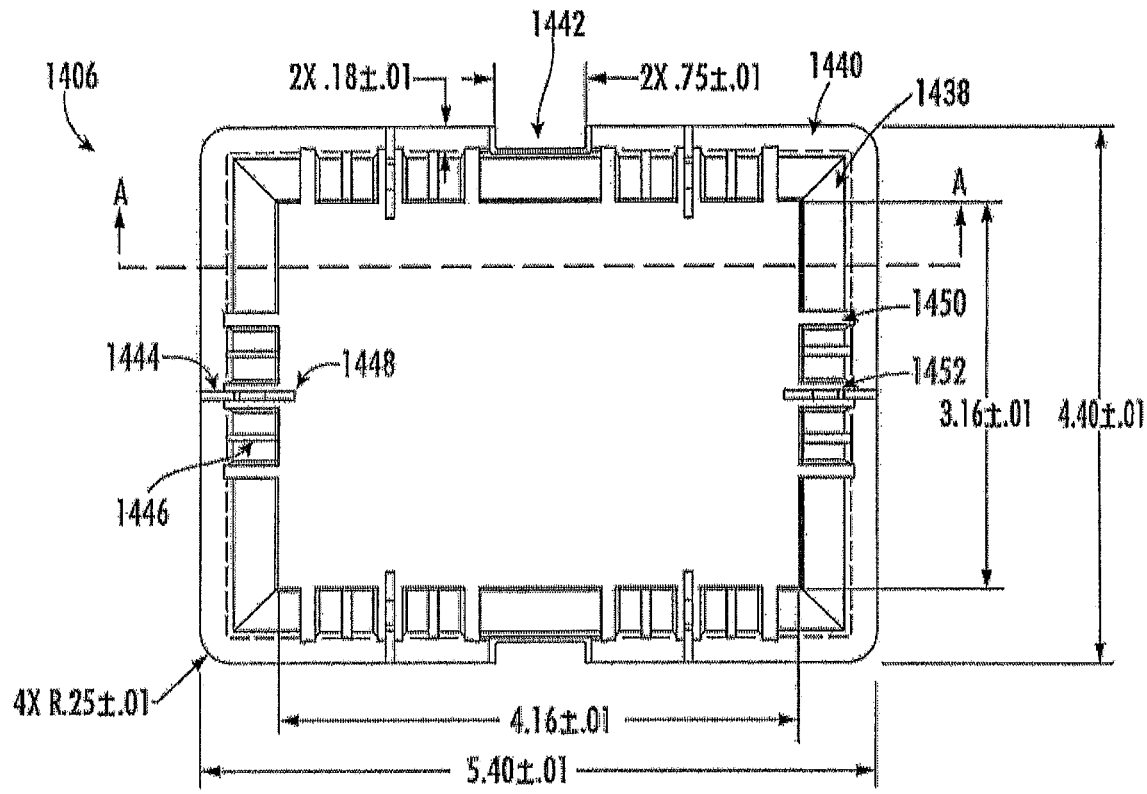
Figure 13C:
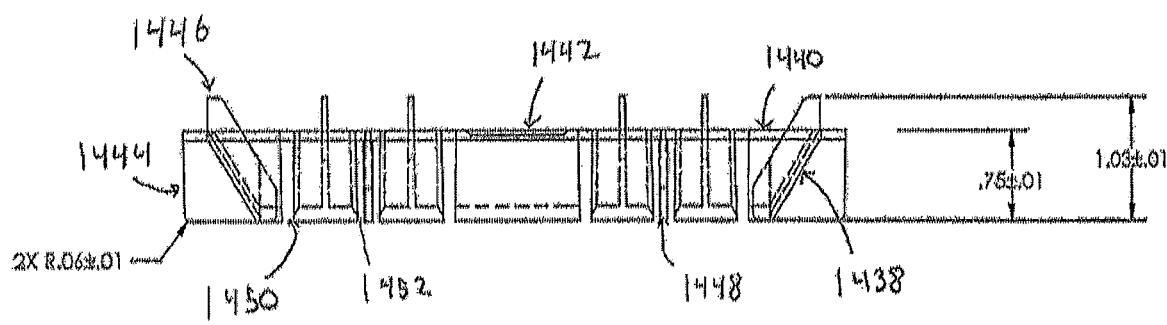
Figure 13D:
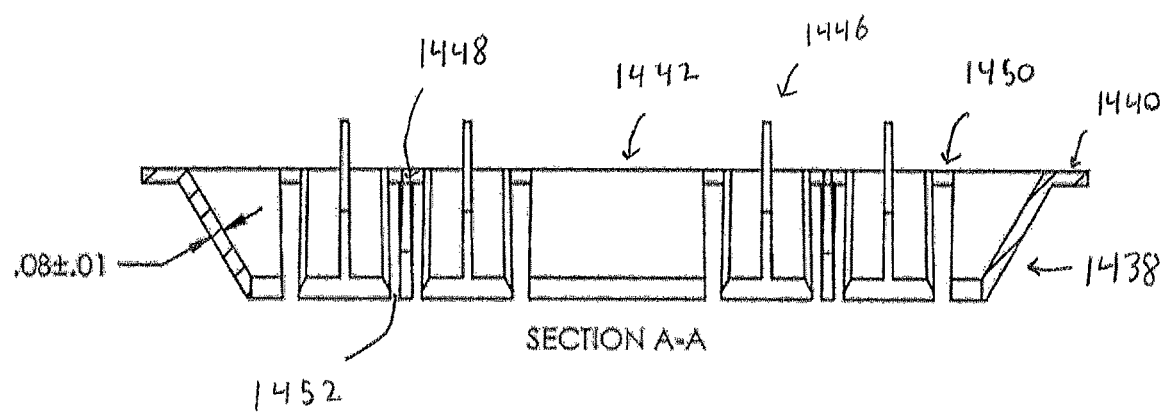
Figure 13E:
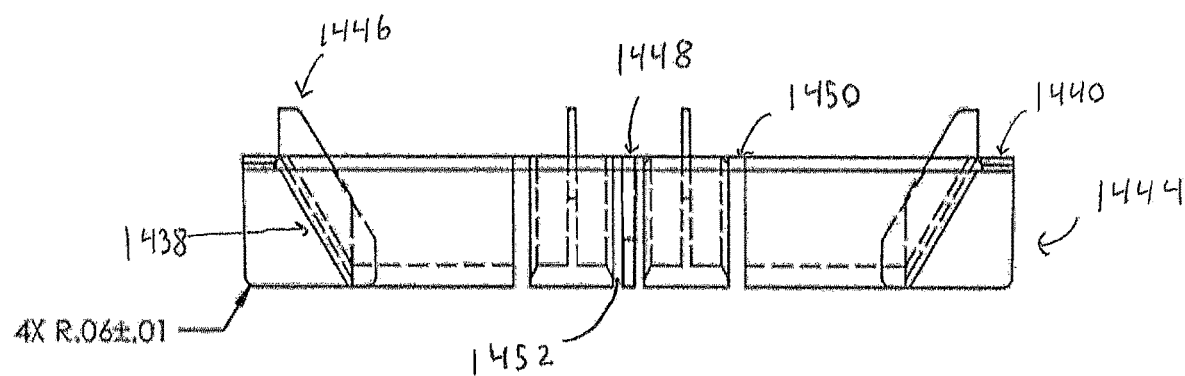

Referring now also to FIG. 6 in the drawings, a junction box 600 according to an alternative embodiment of the present application comprises a housing 602 and a base plate 604, in which base plate 604 is configured to connect with the housing 602 and attach to a support beam 606. Junction box 600 includes similar features as junction box 100, except having features removed or having features added as discussed and described below.

The attachment of base plate 604 to support beam 606 is an indirect attachment. For example, a base plate telescopic extension 654 is directly attached to the support beam 606 and to a second support beam 656. The telescopic feature is enabled by the extension 654 having a first extension support 658 being slidingly connected to a second extension support 660. The sliding connection enables base plate 604 to be attached between support beams of various dimensions or at various locations between the beams. This variable locating feature correspondingly enables the wiring connection and connectors of junction box 600 to be located at almost any desired location between support beams.

Although attachment of junction box 100 has been described relative to a support beam, this description is not meant to be limiting. For example, the junction box may be attached to a wall, wall stud, ceiling, ceiling joist, rafter, or similar structural support.

Referring now also to FIGS. 7A-7H and 8A-8F in the drawings, an alternative embodiment of a junction box according to the present application is illustrated. A junction box 1200 comprises a housing 1202 and a base plate 1204. Base plate 1204 is configured to connect with housing 1202 and attach to a support beam similar to the support beams discussed above. Junction box 1200 includes similar features as junction box 100, except having additional features as discussed and described below. Although junction box 1200 has been shown as having a square or rectangle shape with four side walls and a top, it will be appreciated that junction box 1200 may have different geometrical shapes, such as circular, having a cylindrical side wall and a top.

Housing 1202 includes one or more flexible tabs 1210. Flexible tabs 1210 are separated from the walls of housing 1202 by cuts or gaps and are configured to flex inwardly as housing 1202 is snapped and/or secured to base plate 1204, provided a wire is present between base plate 1204 and flexible tab 1210, as will be explained in more detail below. As such, flexible tabs 1210 include a live hinge along a top edge. One or more flanged tabs 1212 extend downwardly from housing 1202 and are sized and shaped to be received by attachment slots 1218 in base plate 1204. Flanged tabs 1212 and slots 1218 allow for ease of removal of housing 1202 from base plate 1204 by merely pressing flanged tabs 1212 inwardly.

Housing 1202 includes outside guide members 1211 on each side of each flexible tab 1210. Outside guide members 1211 extend outwardly from housing and are perpendicular to the wall of housing 1202. Outside guide members assist in making sure that the wire is inside the space of each flexible tab 1210 and aid in preventing debris from getting into housing 1202 during use. Similarly, housing 1202 includes inside guide members 1213 on each side of each flexible tab 1210. Inside guide members 1213 extend inwardly from housing and are perpendicular to the wall of housing 1202. Inside guide members also assist in making sure that the wire is inside the space of each flexible tab and aid in preventing debris from getting into housing 1202 during use.

In this embodiment, housing 1202 has a solid, integral top 1215. However, it will be appreciated that top 1215 may be removeable and may be connected to housing 1202 by various types of fasteners. It is preferred that the size, shape, material, and other parameters of housing 1202 meet the requirements of various code regulations.

Base plate 1204 includes a generally flat base member 1203 and one or more attachment tabs 1219 extending down from base member 1203. Attachment tabs 1219 are preferably integral with base plate 1204. Attachment tabs 1219 are sized and shaped to snuggly straddle the short side of a 2×4, or other sized, stud, rafter, or other support member, such as support beam 106. Each attachment tab 1219 includes one or more inwardly protruding ridges 1221 to aid in securing base plate 1204 to support beam 106. Attachment tabs 1219 may also include one or more apertures 1223 through which a fastener may be passed to attach base plate 1204 to support beam 106.

Base plate 1204 preferably includes an upraised peripheral ridge 1226. Ridge 1226 preferably includes one or more notches 1227. Notches 1227 are aligned with flexible tabs 1201 and are sized and shaped to receive the wires. Base plate 1204 may also include apertures 1230 through which fasteners may be passed to secure base plate 1204 to support beam 106 or to bar hanger 1300 (see FIGS. 9A-9F and 10A-10E).

Referring now also to FIGS. 9A-9F and 10A-10E in the drawings, a bar hanger 1300 according to the present application is illustrated. Bar hanger 1300 is a telescoping hanger for supporting junction box 1200. Bar hanger 1300 includes a female tube 1310 and a male rail 1320 that slides into female tube 1310. Bar hanger 1300 is sized and configured to span and attach to one or more studs, rafters, joists, or other support members, such as support beams 106. Bar hanger 1300 preferably telescopes to span between support beams that are centered on distances from 12" to 24"; however, other bar hanger 1300 may be sized and shaped to work with other ranges, as well. Bar hanger 1300 is configured to receive junction box 1200, thereby allowing junction box 1200 to receive and secure one or more joined or spliced wires, such as wires 409 and connector 407, that are located between two support beams. Apertures 1230 in base plate 1204 allow junction box 1200 to be quickly and easily attached to bar hanger 1300.

Female tube 1310 includes an elongated tube portion 1312 and a first attachment tab 1314. Male rail 1320 includes an elongated rail portion 1340 and a second attachment tab 1342. Male rail 1320 is sized and shaped to snuggly slide into female tube 1310. Tube portion 1312 includes one or more adjustment apertures 1316 on a lower side of tube portion 1312. Male rail 1320 includes a catch tab 1344 on the lower surface of the end opposite second attachment tab 1342. Catch tab 1344 is sized and shaped to be received by adjustment apertures 1316 of tube portion 1312. First attachment tab 1314 includes one or more upraised ridges 1318 for engaging and gripping support beam 106. Similarly, second attachment tab 1342 includes one or more upraised ridges 1348 for gripping and engaging a second support beam 106. First attachment tab 1314 and second attachment tab 1342 may include apertures 1329 and 1345, respectively, through which fasteners may be passed to secure first attachment tab 1314 and second attachment tab 1342 to the sides of support beams 106.

Adjustment apertures 1316 are selectively spaced along tube portion 1312, such that when catch tab 1344 is received in one of adjustment apertures 1316, then first and second attachment tabs 1314 and 1342 are selectively spaced to overlay and snuggly span support beams 106 that are either 12" center-to-center, 16" center-to-center, 24" center-to-center, or any other standard measurement. Optional apertures may be located along the length of tube portion 1312 to secure male rail 1320 to tube portion 1312 with fasteners for those situations in which catch tab 1344 does not line up with one of adjustment apertures 1316.

Tube portion 1312 also includes angled grooves 1322a and 1322b (see FIG. 9F) along the lower corners thereof. Angled grooves 1322a and 1322b are sized and shaped to receive opposing inwardly protruding ridges 1221 of base plate 1204. Thus, it is preferred that base plate 1204 be slipped onto tube portion 1312 before male rail 1320 is slid into tube portion 1312.

Referring now to FIGS. 11A-11D, 12A-12E, and 13A-13E, various views of the preferred embodiment of a junction box 1400 according to the present application are illustrated. Junction box 1400 comprises a housing 1402, a base plate 1404, and a locking insert 1406. Base plate 1404 is configured to connect with housing 1402 and attach to a support beam similar to the support beams discussed above. Junction box 1400 includes similar features as junction box 100, except having additional features as discussed and described below. Although junction box 1400 has been shown as having a square or rectangle shape with four side walls and a top, it will be appreciated that junction box 1400 may have different geometrical shapes, such as circular, having a cylindrical side wall and a top.

Referring now to FIGS. 11A-11D in the drawings, housing 1402 of junction box 1400 is depicted. The boundary of housing 1402 is formed by a straight wall 1408 and a slanted wall 1410. The edges of straight wall 1408 are curved and straight wall 1408 forms the bottom boundary of housing 1402 and connects to slanted wall 1410 at the top of straight wall 1408. The edges of slanted wall 1410 are also curved, slanted wall 1410 is slanted upward and forms the upper boundary of housing 1408 and at the top of the wall it connected to housing top 1416. Housing 1402 may be configured to have different geometric shapes and these two walls will be adjusted to form those shapes in those situations. Connected to the bottom of straight wall 1408 are two Flanged tabs 1412. Flanged tabs 1412 includes one or more flanges 1414, where a shape or dimension of flanges 1414 may vary. For example, flanges 1414 may be curved and have a different length, such as ½ inch. Flange 1414 of flanged tab 1412 fits beneath a recess 1434 formed in base plate 1404, This fitting allows for ease of removal of housing 1402 from base plate 1404 by merely pressing flange 1414 of tab 1414 that is protruding beneath recess 1434.

In this embodiment, housing 1402 has a solid, integral top 1416. However, it will be appreciated that top 1416 may be removable and may be connected to housing 1402 by various types of fasteners. It is preferred that the size, shape, material, and other parameters of housing 1402 meet the requirements of various code regulations.

Figure 14A:
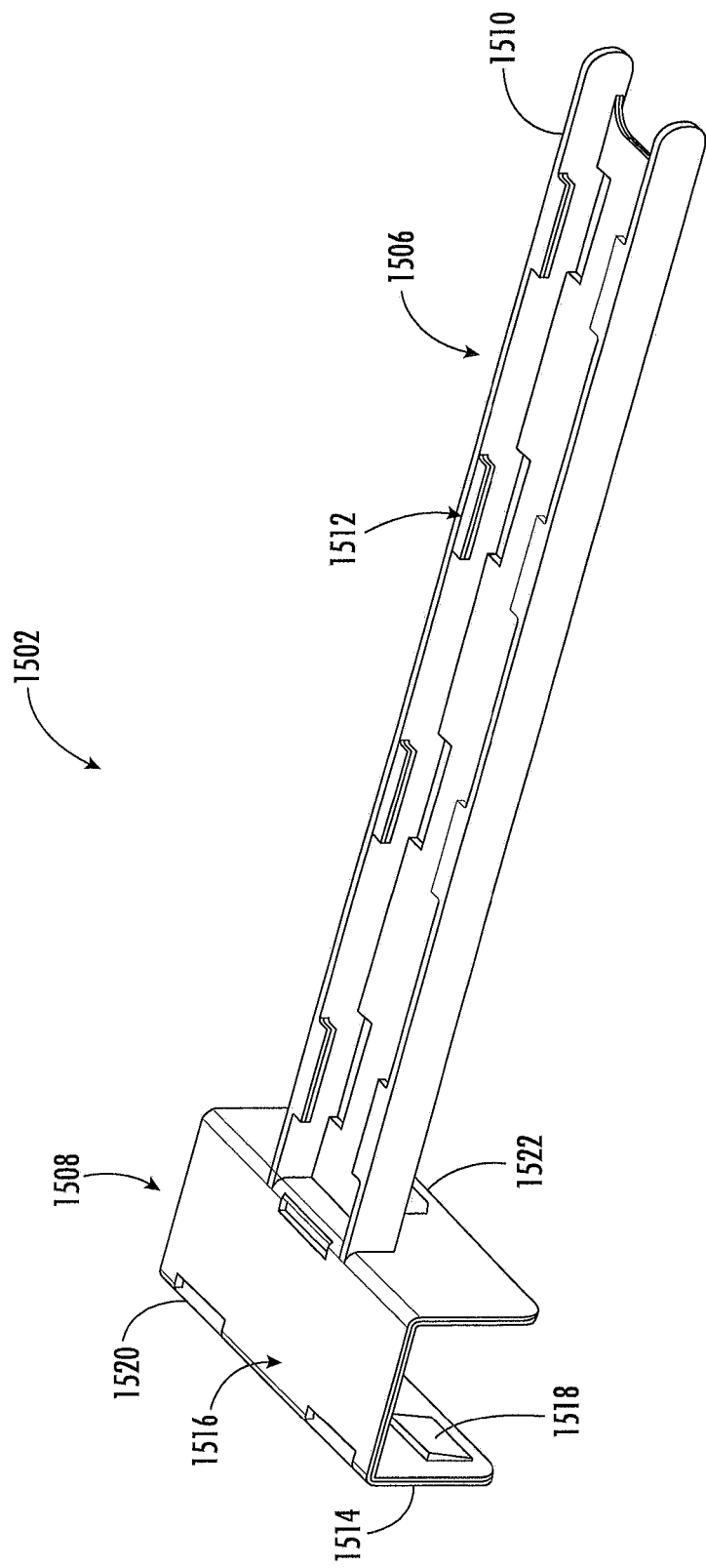
FIGS. 14A-14C are various views of a telescoping hanger bar corresponding to the junction box depicted in FIGS. 11A-11D, 12A-12E, and 13A-13E.
Figure 14B:
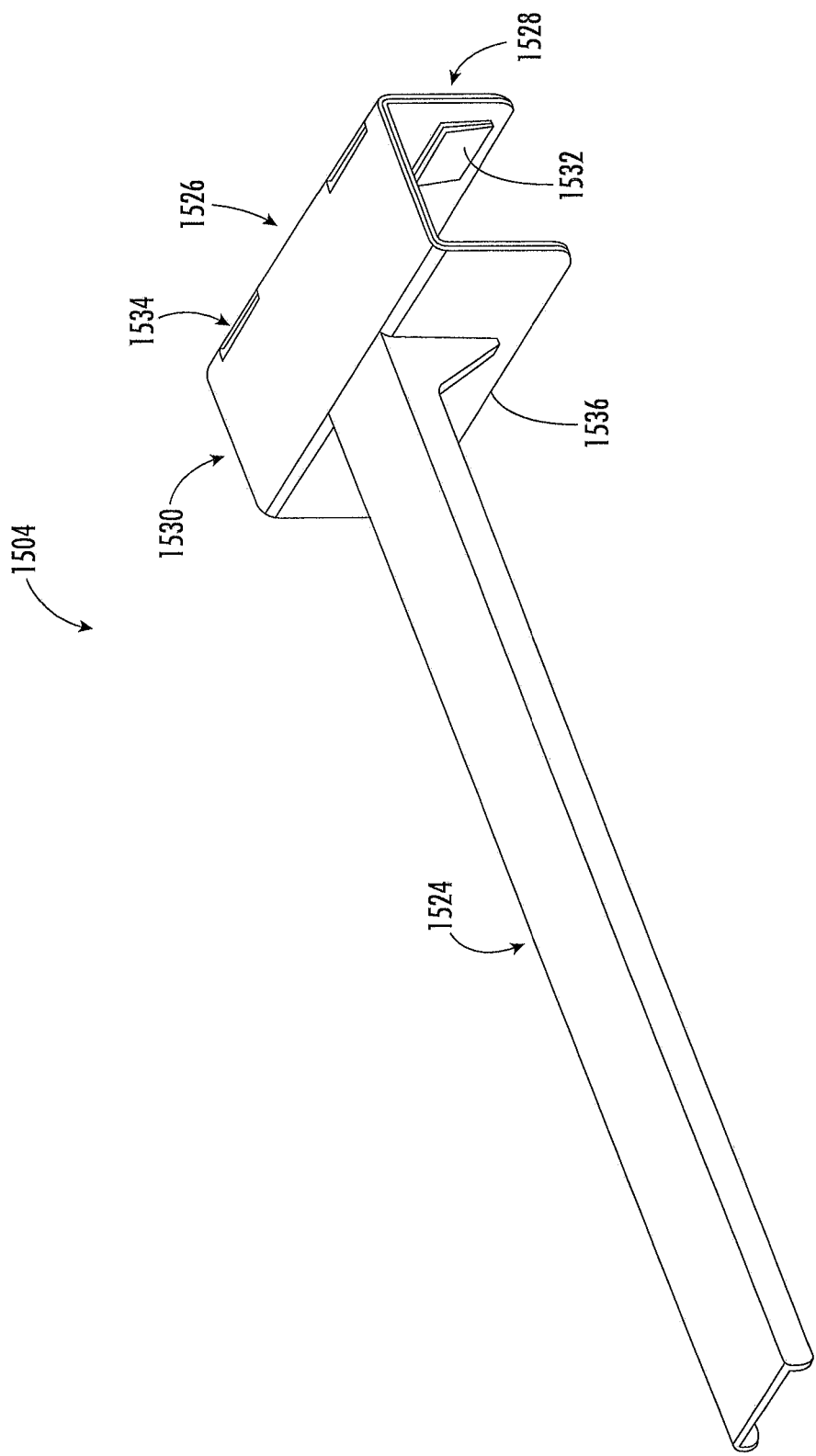
Figure 14C:
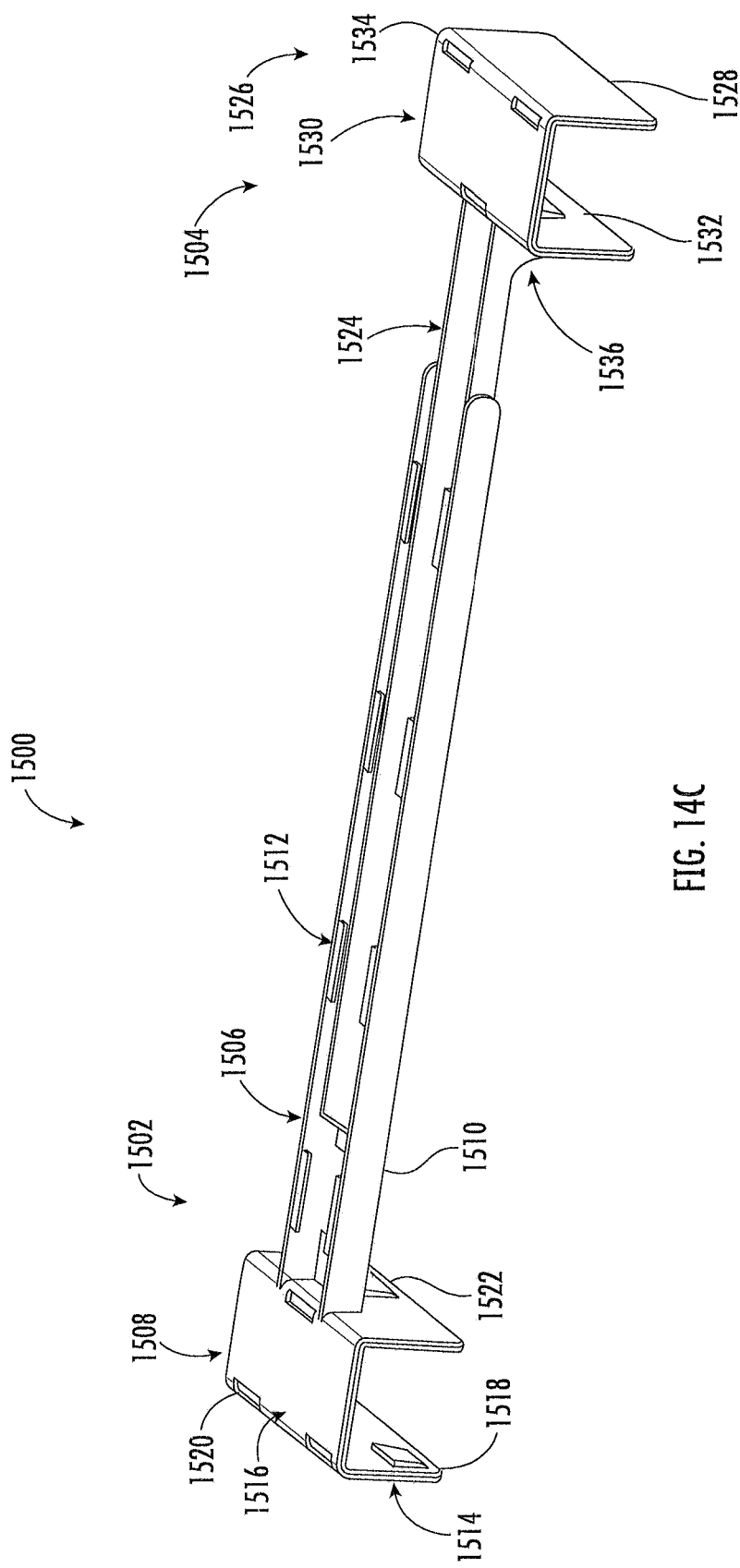

Referring now to FIGS. 12A-12E, base plate 1404 of junction box 1400 is depicted. Base plate 1404 includes a generally flat base member 1418 and one or more attachment tabs 1420 extending down from base member 1418. Attachment tabs 1420 are preferably integral with base plate 1404. Attachment tabs 1420 are sized and shaped to snuggly straddle the short side of a 2×4, or other sized, stud, rafter, or other support member, such as support beam 106. Each attachment tab 1420 includes one or more inwardly protruding ridges 1424 to aid in securing base plate 1404 to support beam 106. Attachment tabs 1420 also include one or more ridges 1422 on the outside of attachment tab 1420 that connect to the generally flat base member 1418 for added support of base plate 1404. Base plate 1404 preferably includes a slanted peripheral ridge 1426 that is slanted upward and connects to a straight peripheral ridge 1428. The edges of these peripheral ridge are curved like the walls in housing 1402. Ridge 1426 preferably includes one or more notches 1430. Notches 1430 are places along the edge of base plate 1404 where there are no peripheral ridges. These locations will allow the locking mechanism 1406 to fit into place on the base and lock down the housing 1402. There are two of these notches on each of the long sides of the base plate 1404 and one on each of the short sides of the base plate 1402. There may be more or less of these notches added to the embodiment depending on the need. Along the edges of these notches when it goes back to the peripheral edges, there are inward facing support ridges 1432 to support the peripheral edges. Since the edges will not connect all around the edges of base plate 1404, these support ridges 1432 maintain the stability and support of the peripheral edges. The straight peripheral edge 1428 also can have a recess 1434 in it where flanges 1414 from housing 1402 will connect. This recess 1434 will be formed at the place where slanted peripheral edge 1426 and straight peripheral edge 1428 meet and will be on the inside of the straight peripheral edge 1428. Once the flanges 1414 are inserted into recess 1434, housing 1402 will snuggly fit into the base plate 1404. Base plate 1404 may also include apertures 1434 through which fasteners may be passed to secure base plate 1404 to support beam 106 or to bar hanger 1500 (see FIGS. 14A-14C).

Referring now to FIGS. 13A-13E, locking insert 1406 of junction box 1400 is depicted. Locking insert 1406 consists of an upward slanted wall 1438 that forms the perimeter of the entire insert. Slanted wall 1438 is configured to be slightly smaller than the peripheral edges of base plate 1404 so that locking insert 1406 will snuggly fit into base plate 1404. At the top of slanted wall 1438 there is a horizontal ridge 1440 that protrudes slightly out. This ridge 1440, will rest on the small area between the two peripheral walls in base plate 1404. Ridge 1440 provides support for locking insert 1406 when it is inserted by allowing it to rest on the peripheral edges. Ridge 1440 contains a gap 1442 along its longer edge that will correspond with where the flange 1414 will slide into the recess 1434 connecting base plate 1404 to housing 1402. This gap 1442 can be configured to be at any spot along ridge 1440 to correspond to where recess 1434 is on base plate 1404. Where there are the notches 1430 in base plate 1404, there is an outward support ridge 1444 that connects the base of slanted wall 1438 to the edge of Referring now also to FIGS. 14A-14C in the drawings, a bar hanger 1500 according to the present application is illustrated. Bar hanger 1500 is a telescoping hanger for supporting junction box 1400. Bar hanger 1500 includes a female tube 1502 and a male rail 1504 that slides into female tube 1502. Bar hanger 1500 is sized and configured to span and attach to one or more studs, rafters, joists, or other support members, such as support beams 106. Bar hanger 1500 preferably telescopes to span between support beams that are centered on distances from 12" to 24"; however, other bar hanger 1500 may be sized and shaped to work with other ranges, as well. Bar hanger 1500 is configured to receive junction box 1400, thereby allowing junction box 1400 to receive and secure one or more joined or spliced wires, such as wires 409 and connector 407, that are located between two support beams. Apertures 1436 in base plate 1404 allow junction box 1400 to be quickly and easily attached to bar hanger 1400.

Female tube 1502 includes an elongated tube portion 1506 and an attachment tab 1508. Male rail 1504 includes an elongated rail portion 1524 and a second attachment tab 1526. Male rail 1504 is sized and shaped to snuggly slide into female tube 1502. Tube portion 1506 includes one or more adjustment apertures 1510 on a lower side of tube portion 1506. These adjustment apertures 1510 are small rectangular grooves on both sides of the edge of the bottom of elongated tube portion 1504. Elongated tube portion 1506 also has tabs 1512 along the top of it to keep the male rail 1504 in place instead of being a fully closed tube. These tabs 1512 are located above the adjustment apertures in the elongated tube portion 1506. First attachment tab 1508 is formed by having two straight walls 1514 that are connected by a horizontal roof 1516 which contains apertures 1520 on its top so that base plate 1404 can be fastened to attachment tab 1508. The straight walls 1514 are distanced from each other to snuggly straddle the short side of a 2×4, or other sized, stud, rafter, or other support member, such as support beam 106. Straight walls 1514 also include one or more upraised ridges 1518 for engaging and gripping support beam 106. Straight walls 1514 also contain a support ridge on the outside to provide support to the elongated tube portion 1506. Similarly, second attachment tab 1526 is structurally the same as first attachment tab 1508.

Junction box 1400 is particularly well suited to remedy the dangerous situation in which two or more wires have been connected together (with or without the use of a connector) without a junction box. In such situations, base plate 1404 is slid between wires 409 and support beam 106. Then, base plate 1404 is pressed over support beam 106, such that ridges 1424 of attachment tabs 1420 grip onto and straddle support beam 106. Base plate may be secured to support beam 106 with fasteners. Wires 409 are then placed into notches 1430 of base plate 1404. Then, housing 1402 is placed over base plate 1404 and snapped into place by forcing flanged tabs 1412 through slots 1434 of base plate 1404.

For those situations in which wires 409 are joined between two support beams 106, bar hanger 1500 may be used. Once base plate 1404 is installed on bar hanger 1500, then bar hanger 1500 may be mounted to two support beams 106, thereby securing joined wires 409.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

We claim:

1. A junction box for attachment to a support beam to conceal wires, comprising:
   a base plate comprising:
      a base member;
      one or more attachment tabs extending down from the base member, the attachment tabs being configured to straddle the support beam; and
      one or more attachment slots;
   a housing comprising:
      one or more side walls and a top;
      one or more flanged tabs extending down from the side walls, the flanged tabs being configured to be received within the attachment slots, so as to secure the housing to the base plate; and
   a locking mechanism.

2. The junction box according to claim 1, wherein the housing and the base plate have four side walls.

3. The junction box according to claim 1, wherein the housing and the base plate have a circular shape.

4. The junction box according to claim 1, further comprising:
an upraised slanted wall around the peripheral edge of the base plate.

5. The junction box according to claim 4, further comprising:
an upraised straight wall along the upper edge of the upraised slanted wall.

6. The junction box according to claim 1, further comprising:
notches disposed along the walls of the base plate down to the base member.

7. The junction box according to claim 1, wherein the top of the housing is removable.

8. The junction box according to claim 1, wherein the top of the housing is hingedly coupled to the side wall.

9. The junction box according to claim 1, wherein the housing is a two-piece housing.

10. The junction box according to claim 1, further comprising:
a telescoping bar hanger.

11. The junction box according to claim 10, wherein the bar hanger comprises:
a female tube comprising:
an elongated tube portion;
a first attachment tab configured for attachment to the support beam; and
angled grooves along the length of the elongated tube, the angled grooves being configured to receive the attachment tabs of the base plate; and
a male rail comprising:
an elongated rail portion;
a second attachment tab configured for attachment to a second support beam.

12. The junction box according to claim 11, further comprising:
a catch tab disposed near an end of the elongated rail portion;
one or more adjustment apertures selectively spaced along the length of the tube portion, the adjustment apertures being sized and shaped to receive the catch tab, whereby the span of the bar hanger may be selectively adjusted.

13. The junction box according to claim 11, further comprising:
one or more upraised ridges disposed on the first attachment tab for engagement with the support beam; and
one or more upraised ridges disposed on the second attachment tab for engagement with the second support beam.

14. A method of securing electrical wiring having a spiced connection to a support beam, comprising:
providing a junction box having a housing and a base plate;
wherein the base plate comprises:
a base member;
one or more attachment tabs extending down from the base member, the adjustment tabs being configured to straddle the support beam; and
one or more attachment slots; and
wherein the housing comprises:
one or more side walls and a top;
one or more flanged tabs extending down from the side walls, the flanged tabs being configured to be received within the attachment slots, so as to secure the housing to the base plate; and
one or more flexible tabs disposed in the side wall, the flexible tabs being configured to flex inwardly and press against the wires when the housing is connected to the base plate;
inserting the base plate between the support beam and the spiced connection;
securing the base plate relative to the support beam; and
connecting the housing to the base plate.

15. The method according to claim 14, wherein the step of securing the base plate relative to the to the support beam is achieved by straddling the support beam with the attachment tabs of the base plate.

16. The method according to claim 14, further comprising:
providing as telescoping bar hanger;
wherein the step of securing the base plate relative to the to the support beam is achieved by straddling the bar hanger with the attachment tabs of the base plate.

* * * * *